US00RE41105E

(19) United States
(12) Reissued Patent
Omi et al.

(10) Patent Number: US RE41,105 E
(45) Date of Reissued Patent: Feb. 9, 2010

(54) WIRELESS COMMUNICATIONS SYSTEM WITH DYNAMIC TRANSMISSION BAND ASSIGNMENT

(75) Inventors: Shinichiro Omi, Osaka (JP); Hiroshi Hayashino, Hyogo (JP); Hiroyuki Imai, Hyogo (JP); Kazuhiro Ando, Osaka (JP)

(73) Assignee: Panasonic Corporation, Osaka (JP)

(21) Appl. No.: 12/047,092

(22) Filed: Mar. 12, 2008

Related U.S. Patent Documents

Reissue of:
(64) Patent No.: 7,012,902
Issued: Mar. 14, 2006
Appl. No.: 11/140,988
Filed: Jun. 1, 2005

U.S. Applications:
(62) Division of application No. 09/722,593, filed on Nov. 28, 2000, now Pat. No. 6,940,831.

(30) Foreign Application Priority Data

Nov. 29, 1999 (JP) ..... 11-337119

(51) Int. Cl.
*H04B 7/00* (2006.01)
*H04B 7/212* (2006.01)
*H04L 12/28* (2006.01)
*H04J 3/06* (2006.01)

(52) U.S. Cl. ..... 370/310.1; 370/348; 370/395.43; 370/509

(58) Field of Classification Search ..... 370/310.1, 370/338, 348, 395.43, 337, 431, 442, 443, 370/458, 468, 503, 509
See application file for complete search history.

(56) References Cited

U.S. PATENT DOCUMENTS 4,894,823 A 1/1990 Adelmann et al.
5,455,965 A 10/1995 Shaughnessy et al.

(Continued)

FOREIGN PATENT DOCUMENTS

| | | |
|---|---|---|
| EP | 0 804 006 | 10/1997 |
| JP | 7-30646 | 1/1995 |
| JP | 11-4236 | 1/1999 |
| JP | 11-252663 | 9/1999 |

OTHER PUBLICATIONS

S. K. Biswas et al., "Call Admissibility for Multirate Traffic in Wireless ATM Networks" Infocom '97, Sixteenth Annual Joint Conference of the IEEE Computer and Communications Societies, Driving the Information Revolution, Proceedings, IEEE, Kobe, Japan, Apr. 7–11, 1997, Los Alamitos, CA, U.S.A., IEEE Comput, Soc., U.S., Apr. 7, 1997, pp. 649–657, XP010252031.

(Continued)

*Primary Examiner*—Nittaya Juntima
(74) *Attorney, Agent, or Firm*—Wenderoth, Lind & Ponack, L.L.P.

(57) ABSTRACT

A wireless communications system in which real-time data and burst data can be mixedly transmitted, and a transmission band can be dynamically assigned according to a state of data transmission. A master station has a scheduler for determining a transmission band assignment including information about the transmission timing of the data, a transmission amount, and a state that is allowed to access. The scheduler regularly carries out scheduling and optimizes the transmission band to be assigned dynamically according to the communication type of the data and a state of data transmission. The master station gives a transmission band assignment which is determined by the scheduler to each slave station. A transmitting station executes data transmission (access) to a receiving station based on the given transmission band assignment. The receiving station gives information about a state of data receiving to the master station, where the scheduler reflects this on scheduling.

2 Claims, 18 Drawing Sheets

U.S. PATENT DOCUMENTS

| | | | | |
|---|---|---|---|---|
| 5,517,505 | A | 5/1996 | Buchholz et al. | |
| 5,638,371 | A | 6/1997 | Raychaudhuri et al. | |
| 5,970,062 | A | 10/1999 | Bauchot | |
| 6,141,336 | A | 10/2000 | Bauchot et al. | |
| 6,198,728 | B1 | 3/2001 | Hulyalkar et al. | |
| 6,212,196 | B1 | 4/2001 | Momona | |
| 6,526,070 | B1 * | 2/2003 | Bernath et al. | 370/509 |
| 6,546,017 | B1 * | 4/2003 | Khaunte | 370/412 |
| 6,597,683 | B1 | 7/2003 | Gehring et al. | |
| 6,643,295 | B1 * | 11/2003 | Nose | 370/442 |
| 6,650,624 | B1 * | 11/2003 | Quigley et al. | 370/252 |
| 6,654,377 | B1 | 11/2003 | Pasternak et al. | |

OTHER PUBLICATIONS

Liu Hong et al., "Knowledge–based Multiple Access Protocol in Broadband Wireless ATM Networks", Vehicular Technology Conference, 1999, VTC 1999—Fall, IEEE VTS 50th Amsterdam, Netherlands Sep. 19–22, 1999, Piscataway, NJ, U.S.A., IEEE, U.S. Sep. 19, 1999, pp. 1685–1689, XP010353243.

European Search Report issued May 21, 2003 in European Application No. 00 12 5318.

J. G. Kim et al., "PRMA/DA: A New Media Access Control Protocol for Wireless ATM" 1996 IEEE International Conference on Communications (ICC), Coverging Technologies for Tomorrow's Applications, Dallas, Jun. 23–27, 1996, IEEE International Conference on Communications (ICC), New York, IEEE, U.S., vol. 1, Jun. 23, 1996, pp. 240–244, XP000625675.

* cited by examiner

WIRELESS COMMUNICATIONS SYSTEM WITH DYNAMIC TRANSMISSION BAND ASSIGNMENT

Matter enclosed in heavy brackets [ ] appears in the original patent but forms no part of this reissue specification; matter printed in italics indicates the additions made by reissue.

[This is a divisional of U.S. application Ser. No. 09/722,593, filed on Nov. 28, 2000 and issued as U.S. Pat. No. 6,940,831.] *More than one reissue application has been filed for U.S. Pat. No. 7,012,902. The present application is a reissue application of U.S. Pat. No. 7,012,902, which issued on Mar. 14, 2006, from application Ser. No. 11/140,988, which is a divisional of application Ser. No. 09/722,593, filed on Nov. 28, 2000, now U.S. Pat. No. 6,940,831. A further reissue application of U.S. Pat. No. 7,012,902 has been filed. This further reissue application is application Ser. No. 12/048,632, which is a divisional reissue of application Ser. No. 12/047,092.*

BACKGROUND OF THE INVENTION

1. Field of the Invention

The present invention relates to wireless communications systems and, more specifically, to a system for data communications among a plurality of terminals which are connected to one another through a wireless network, and a method used there in for scheduling (method for assigning a transmission band for data transmission for each communications link), dividing a data packet, and carrying out re-transmission when an error occurs.

2. Description of the Background Art

There have been various systems for data communications among personal computers (hereinafter, PCs) or between PCs and a host computer connected to one another through a network. A wired network such as Ethernet of IEEE 802.3 and Token-Ring of IEEE 802.5 have been part of the main stream of such a network. With the advent of portable PC terminals which do not require any wiring, however, such a wired network is gradually shifting to a wireless network.

The CMSA (Carrier Sense Multiple Access) method, which is one of the conventional access techniques using a wireless network, will now be briefly described with reference to FIG. 21.

In FIG. 21, PCs 501 to 504 are connected to wireless access devices 505 to 508, respectively. The wireless access devices 505 to 508 are connected to one another through a wireless network. Here, a case is described where data is transmitted from the PC 501 to the PC 502, and then, after a short while, other data is transmitted from the PC 503 to PC 504.

When receiving a data transmission request from the PC 501, the wireless access device 505 measures received field intensity through a receiving operation so as to check whether or not any other wireless access device is in communication. If not, the wireless access device 505 sequentially transmits the data that is provided by the PC 501 to the wireless access device 506. The wireless access device 506 transfers the data that is received from the wireless access device 505 to the PC 502.

When receiving a data transmission request from the PC 503 shortly after the wireless device 505 receives the above-mentioned request from the PC 501, the wireless access device 507 similarly measures received field intensity through the receiving operation so as to check whether or not any other wireless access device is in communication. At this time, the wireless access device 505 is still carrying out data transmission. Therefore, the wireless access device 507 waits until this data transmission ends. Then, after this data transmission ends, the wireless access device 507 sequentially transmits the data that is provided by the PC 503 to the wireless access device 508. The wireless access device 508 transfers the data that is received from the wireless access device 507 to the PC 504.

However, in conventional wireless communications systems using the CSMA method, if the plurality of PCs each send a transmission request simultaneously, the wireless access devices try to start transmission, leading to transmission collisions on the wireless network. This is because the wireless access devices can only check whether transmission is actually being made at the time of measuring field intensity. In other words, the wireless access devices cannot detect transmission that will be made in future. Moreover, the wireless access devices are not capable of detecting collision, and therefore, the wireless access devices may erroneously determine that transmission has succeeded even though transmission has not succeeded due to collision. Such collision will occur more frequently as the number of wireless access devices or the number of transmissions that are tried by the wireless access devices increases.

To get around the above problem, time-division transmission methods such as TDM and TDMA can be applied so as to avoid transmission collisions on the wireless network when a plurality of wireless access devices each send a data transmission request simultaneously. In such time-division methods, a transmission band is previously divided into several bands, and a divided band is assigned for each data transmission request. Thus, each wireless access device can make data transmission by using each specific transmission band, and transmission collisions can be prevented on the wireless network.

In the near future, a network such as LAN will be introduced to households. For such a household network, a wireless network is desirable because wiring is not required and devices which are connected to the network can be easily moved. With such a network, digital video data will mostly be used as transmission contents. However, such digital video data is generally large in volume, and requires high speed for transmission. Moreover, for the transmission of digital video data from a set-top box or video player to a television set, a real-time transmission is required.

In the above-described conventional wireless communications system using the CSMA method, however, transmission efficiency is low because transmission collisions on the wireless network should be avoided. Therefore, it is difficult to achieve real-time, high-capacity, high-speed transmission of digital video data.

Furthermore, in the conventional time-division wireless communications system, a transmission band is fixedly assigned to each generated data transmission request. Therefore, when a state of data transmission is changed, the transmission band cannot be changed until the data transmission ends. One example of wireless communications systems where a transmission band is fixedly assigned is disclosed in Japanese Patent Laid-Open Publication No. 11-252663 (1999-252663). Therefore, in the conventional wireless communications system, real-time data transmission may be impaired.

SUMMARY OF THE INVENTION

Therefore, an object of the present invention is to provide a wireless communications system in which real-time data that is typified by moving-picture data and burst data that is typified by control data can both be transmitted, and a transmission band can be dynamically assigned according to a state of data transmission.

The present invention has the following features to achieve the stated object.

The present invention is directed to a wireless communications system in which a wireless access unit (hereinafter, master station) for managing a wireless network and one or more other wireless access units (hereinafter, slave stations) are on the wireless network, and data of one or a combination of communication types include:

CBR (constant in transmission speed and data period);

VBR (variable in transmission speed and constant in data period);

ABR (constant in transmission speed and variable in data period); and

UBR (variable in transmission speed and data period) is transmitted between the master station and one of the slave stations or between the slave stations.

The master station comprises a scheduler for regularly determining (scheduling) a transmission band assignment including information about the transmission timing of the data, a transmission amount, and the master station or any of the slave stations that is allowed to access.

In order to make a request for setting a communication link for data transmission, the master station provides the scheduler with a communication parameter for the data transmission.

In order to make the request for setting the communication link for data transmission, the slave station provides the scheduler with a communication parameter for the data transmission by transmitting a communication parameter for the data transmission to the master station by using a request packet.

The master station gives the transmission band assignment which is scheduled by the scheduler to the slave station by using a band assignment packet, and recognizes the transmission band assignment.

A transmitting station (the master station or the slave station that sends the data) and a receiving station (the master station or the slave station that receives the data) between which the communication link is set by the transmission band assignment carry out bidirectional data transmission according to the transmission band assignment.

Preferably, when the communication type that is indicated by the communication parameter is CBR, VBR, or ABR, the scheduler rejects the request for setting the communication link if a transmission bandwidth which is required for the communication link exceeds an unused transmission bandwidth (empty bandwidth), and receives the request for setting the communication link and updates a sum of the transmission bandwidths in use for already-allocated communication links (used bandwidth) if otherwise.

Further, preferably, when the communication type that is indicated by the communication parameter is UBR, the scheduler receives the request for setting the communication link irrespective of the empty bandwidth.

Also, preferably, the scheduler recognizes a state of data receiving for each communication link by receiving, from the receiving station, an acknowledgement packet indicating the state of data receiving as to the bidirectional data transmission in which the communication link is set, and determines the transmission band assignment so as to reflect the state of data receiving and satisfy the previously-set communication parameters.

Also, preferably, for setting the communication link, if the communication type is CBR, the scheduler multiplies a speed parameter indicating a transmission speed by a period parameter indicating a data occurrence period so as to calculate a data amount parameter indicating an amount of data to be transmitted. Alternatively, if the communication type is VBR, the scheduler divides the data amount parameter by the period parameter so as to calculate the speed parameter, and, if the communication type is ABR, the scheduler divides the data amount parameter by the speed parameter so as to calculate the period parameter. Also, preferably, when the communication type that is indicated by the communication parameter is CBR, VBR, or ABR, the scheduler calculates a difference Tb between a present time or a reference time, which is a transmission time of the assigned transmission band, and a time when data transmission on each communication link has been completed.

When the difference Tb is positive, for each communication link, the scheduler preferably calculates a difference Vdd between a data amount parameter which is included in the communication parameter and indicating an amount of data to be transmitted and an amount of data already received by the receiving station (received data amount), calculates a priority value by subtracting an overhead bandwidth from an entire transmission bandwidth of the system so as to obtain an effective transmission bandwidth, multiplying the effective transmission bandwidth by the difference Tb so as to obtain a value, and then dividing the difference Vdd by the value, and selects one or more communication links whose priority value is not less than a predetermined value and predetermined in decreasing order or whose priority value is not less than a random number generated within a predetermined range as the communication link assigned the transmission band, and on the other hand, when the difference Tb is not more than 0, the scheduler preferably selects one or more communication links in increasing order of the difference Tb as the communication link which is assigned the transmission band.

Also, preferably, the scheduler updates the received data amount of each communication link based on an acknowledgement packet indicating a state of data receiving transmitted from the receiving station.

Also, preferably, the scheduler updates the received data amount of each communication link by using the transmission amount which is determined by the transmission band assignment, and corrects the received data amount to an effective value based on an acknowledgement packet indicating a state of data receiving transmitted from the receiving station.

Also, preferably, when the difference Vdd of the communication link for scheduling is negative, the scheduler carries out any one of operations of deleting a setting of the communication link, resetting the communication link by the communication parameters currently used, and resetting the communication link with the communication type being changed to UBR.

Also, preferably, when the communication type that is indicated by the communication parameter is UBR, the scheduler carries out the transmission band assignment according to an order in which the communication link has been set (requested) or a priority order of the priority parameter included in the communication parameter.

Also, preferably, when a period parameter indicating a data period is further provided, the scheduler calculates a difference Tb between a present time or a reference time, which is a transmission time of the assigned transmission band, and a time when data transmission on each communication link has been completed, and carries out transmission band assignment only when the difference Tb is not more than 0.

Also, preferably, when a data amount parameter indicating an amount of data to be transmitted is provided, if an amount of data that is already received by the receiving station (received data amount) exceeds the data amount parameter, the scheduler deletes setting of a relevant communication link.

Also, preferably, when detecting that the transmission band of the set communication link is not used, the scheduler deletes setting of the communication link.

As such, in the present invention, scheduler results of the scheduler, that is, transmission band assignment results are regularly transmitted to the slave station by using a band assignment packet, and bidirectional data transmission is made by using the assigned transmission band. Thus, for any data of CBR, VBR, ABR, and UBR, a band which is required for data transmission is allocated in advance, and data transmission can be completed by a required end time. Moreover, communication links whose priority is not less than the random number are subjected to scheduling, thereby reducing load on the scheduler.

Furthermore, preferably, when assigning data packet transmission from the transmitting station to each transmission band with the communication link set therein a predetermined number of times, the scheduler assigns transmission of the acknowledgement packet from the receiving station at least one.

Thus, one transmission band is used for data packet transmission and acknowledgement packet transmission. Therefore, the transmission band can be used effectively.

Still further, preferably, the scheduler carries out transmission band assignment by dynamically changing a data packet based on the scheduler quality of a wireless channel so that a packet length is shortened when more communication errors occur, and lengthened when fewer communication errors occur.

Thus, for the communication link with more errors, a wider transmission band can be used for data transmission. Still further, preferably, the master station gives, to the slave station, the band assignment packet with a probability parameter for access control of the request packet added thereto, and the slave station transmits the request packet only when the given probability parameter exceeds a random number which is generated within a range of values that the probability parameter can take.

Thus, access concentration on the same transmission band can be avoided.

Still further, preferably, when the transmission band assignment for data transmission has been carried out by the scheduling, the transmitting station divides the data into a specified length for generating data packets for transmission.

Still further, preferably, when a plurality of communication links are set to the transmitting station, if there is no data packet to be transmitted on a specific communication link, the transmitting station transmits a data packet to be transmitted on another communication link by using a transmission band which is assigned to the specific communication link.

Thus, a transmission band not in use can be effectively used.

Still further, preferably, the transmitting station transmits the request packet by using a transmission band in which a communication link is set.

Thus, the request packet is transmitted by using the transmission band in which a communication link has been already set for the transmitting station, thereby avoiding a conflict with other stations.

Still further, preferably, the master station transmits, to the slave station, the band assignment packet with a transmission time stamp value indicating a transmission time added thereto, and the slave station synchronizes a time counter thereof with a time counter of the master station by using the transmission time stamp value.

Thus, the slave station can correctly carry out data transmission according to an instruction by the band assignment packet from the master station.

Still further, preferably, the slave station transmits, to the master station, the request packet with a transmission time stamp value indicating a transmission time added thereto.

When receiving the request packet with the transmission time stamp value added thereto, the master station preferably calculates a space propagation delay time from a difference between a receive time and the transmission time stamp value, and gives, to the slave station, the band assignment packet including an adjusted value according to the space propagation delay time, and the slave station preferably corrects transmission timings of the request packet and the data packet according to the given adjusted value.

Thus, a wasted transmission band due to space propagation delay can be prevented. Therefore, the transmission band can be effectively used.

Still further, preferably, the receiving station that is indicated by a destination address of the band assignment packet, when receiving the band assignment packet correctly, carries out intermittent receiving in timing when the data packet that is transmitted from the transmitting station and the band assignment packet transmitted next from the master station are received.

On the other hand, when not receiving the band assignment packet correctly, the receiving station preferably carries out intermittent receiving only after receiving the next band assignment packet correctly.

Thus, power consumption at the receiving station can be reduced.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
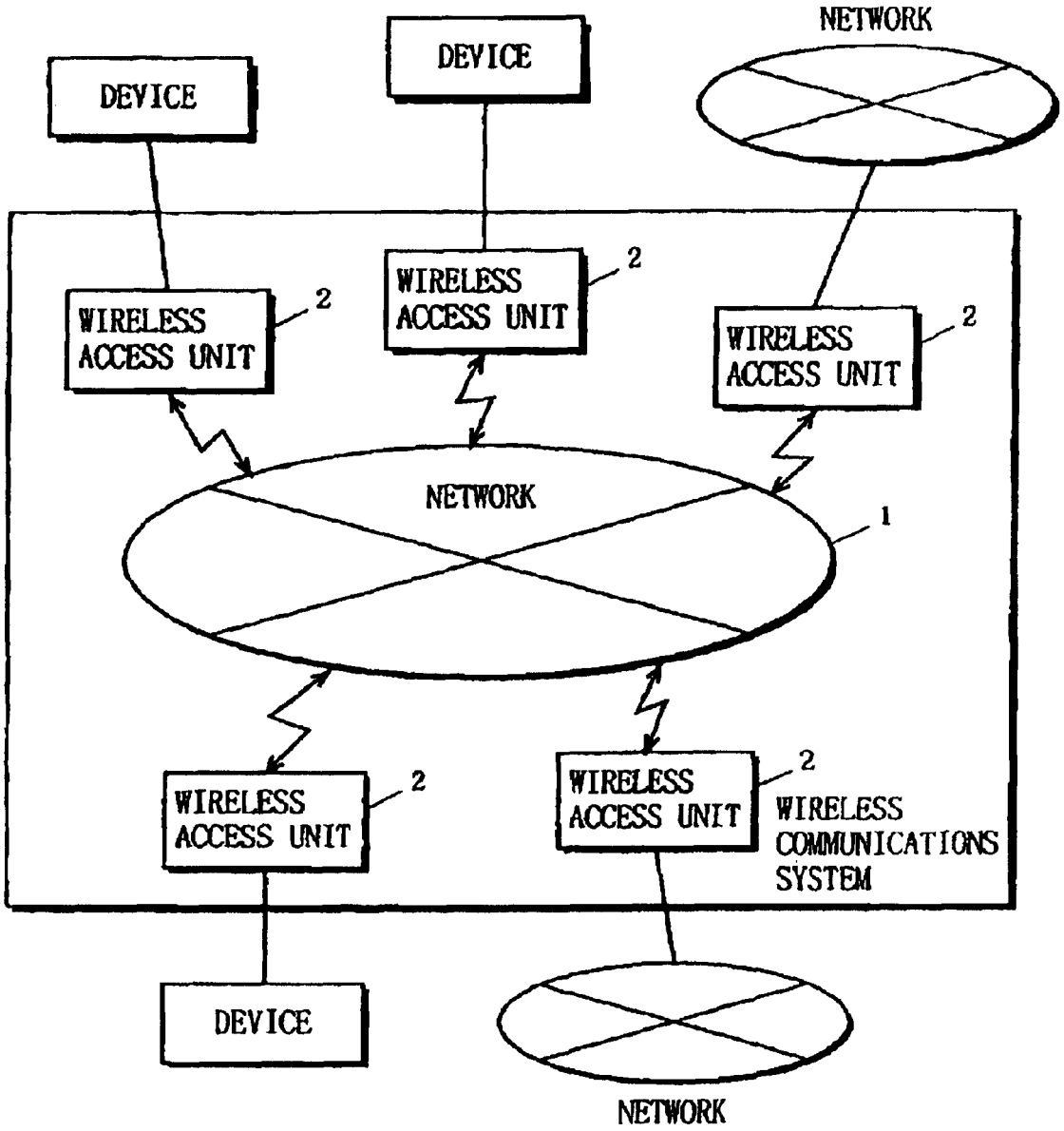
FIG. 1 is a diagram showing one example of an environment where a wireless communications system according to one embodiment of the present invention is used.

FIG. 1 is a diagram showing one example of an environment where a wireless communications system according to one embodiment of the present invention is used. As shown in FIG. 1, in the wireless communications system according to the embodiment of the present invention, data transmission is made among devices such as PCs and television receivers and networks (hereinafter collectively referred to as terminals). Such data transmission includes transmission of video images and video signals to a television and access to the Internet. In the wireless communications system, optimal data transmission is achieved by effectively using limited communications resources. In the wireless communications system according to the present embodiment, a plurality of wireless access units 2 that are connected to the respective terminals are provided, and the plurality of wireless access units 2 are wirelessly connected to one another to form a network 1.

In the present invention, any one of the wireless access units 2 may manage total data communications taking place in the wireless communications system. In the following description, the one wireless access unit 2 which manages total data communications is denoted as a master station 10, while the others are denoted as slave stations 20.

Figure 2:
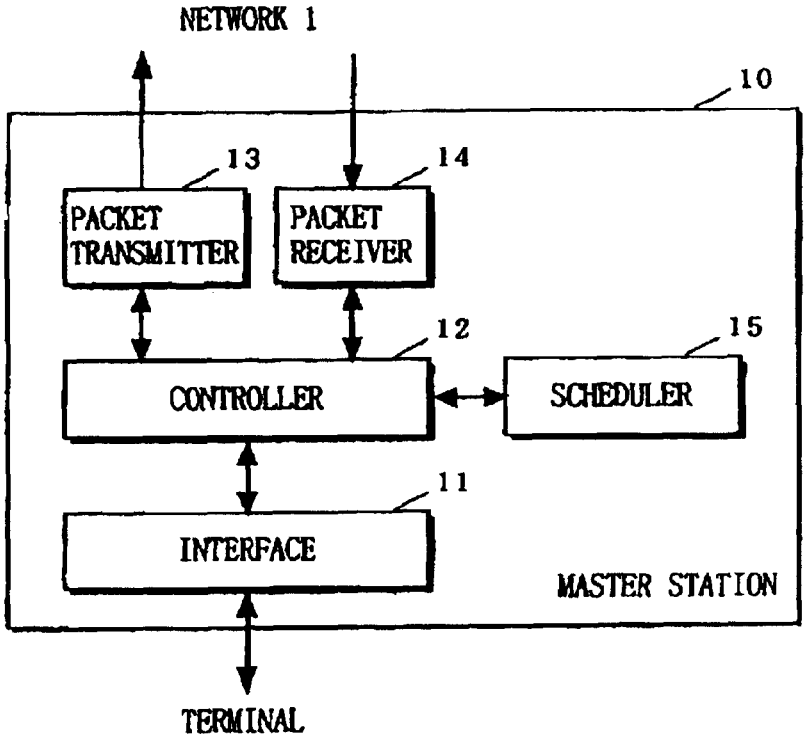
FIG. 2 is a block diagram showing one example of the structure of a master station 10.
Figure 3:
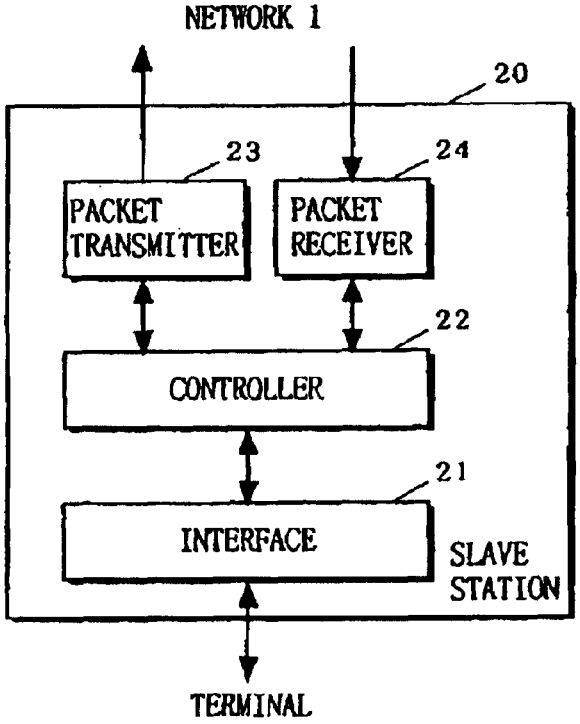
FIG. 3 is a block diagram showing one example of the structure of a slave station 20.

The master station 10 and the slave stations 20 will each be briefly described first. FIG. 2 is a block diagram showing one example of the structure of the master station 10. FIG. 3 is a block diagram showing one example of the structure of the slave station 20.

In FIG. 2, the master station 10 includes an interface 11, a controller 12, a packet transmitter 13, a packet receiver 14, and a scheduler 15. The interface 11 connects the terminals and the master station 10 together. The controller 12 transmits and receives a predetermined packet and controls the operation of the scheduler 15 in order to achieve optimal data transmission in the wireless communications system. The packet transmitter 13 wirelessly transmits the packet that is provided by the controller 12 to the slave stations 20. The packet receiver 14 receives a packet that is wirelessly transmitted from the slave station 20 for output to the controller 12. The scheduler 15 determines the assignment of a transmission band (timing of packet transmission, amount of data transmission, and the like) so as to allocate a communication link which is required for data transmission. This scheduler 15 can handle data of the following communication types: CBR (Constant Bit Rate) at a constant transmission speed and a constant period of data occurrence (hereinafter, data period), as would be appropriate for voice; VBR (Variable Bit Rate) at a variable transmission speed and a constant data period, as would be appropriate for MPEG2 video; ABR (Available Bit Rate) at a constant transmission speed and a variable data period, as would be appropriate for file data transfer; and UBR (Unspecified Bit Rate) at a variable transmission speed and a variable data period, as would be appropriate for control data.

In FIG. 3, the slave station 20 includes an interface 21, a controller 22, a packet transmitter 23, and a packet receiver 24. The interface 21 connects the terminal and the slave station 20 together. The controller 22 transmits and receives a predetermined packet in order to achieve optimal data transmission in the wireless communications system based on the management by the master station 10. The packet transmitter 23 wirelessly transmits the packet that is provided by the controller 22 to the master station 10 or any of the other slave stations 20. The packet receiver 24 receives the packet that is wirelessly transmitted from the master station 10 or any of the other slave stations 20 for output to the controller 22.

Next, the operation which is carried out between the master station 10 and each slave station 20 in the wireless communications system according to the embodiment of the present invention is specifically described in sequence.

(1) Notification of a State of Transmission Band Assignment from the Master Station 10 to Each Slave Station 20

Figure 4:
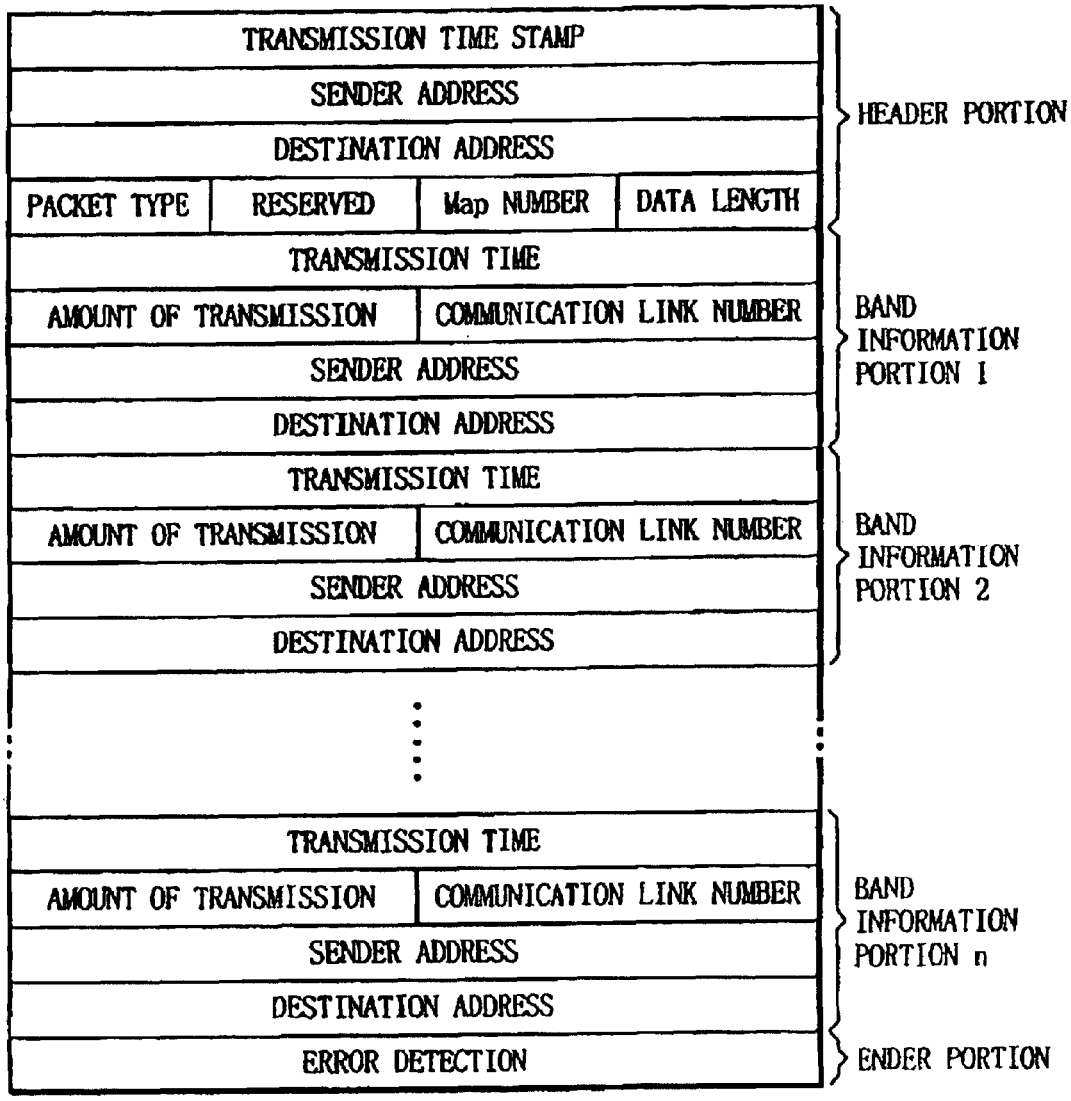
FIG. 4 is a diagram showing one example of the structure of a band assignment packet.

First, the master station 10 divides, in advance, the entire transmission band that is usable in the wireless communications system into several in time. The master station 10 notifies each slave station 20 of a state of each transmission band assignment (e.g., whether a new assignment request has been received or how a transmission band has been assigned) at regular or irregular time intervals. For this notification, a band assignment packet (hereinafter, Map_Packet), which is shown in FIG. 4, is used. As shown in FIG. 4, Map_Packet is composed of a header portion, a plurality of band information portions that correspond to the time-divided transmission bands, and an ender portion.

The header portion is comprised of a transmission time stamp, sender address, destination address, packet type, map number, and data length. In the transmission time stamp, a time when Map_Packet is transmitted is stored based on a time counter of the master station 10. In the sender address, the address of the master station 10, which sends Map_Packet, is stored. In the destination address, a broadcast address indicating all of the slave stations 20 is stored. With the broadcast address stored, the entire transmission band can be used as a competing access band for which the slave stations 20 will compete to transmit data. In the packet type, information indicating that this packet is Map_Packet is stored. In the map number, a serial number that is provided to the packet is stored. Note that the one first transmitted (after system startup, for example) is provided with number one. In the data length, the data length of all band information portions is stored.

The plurality of band information portions each represent how the transmission band is assigned. Each band information portion is composed of a transmission time, transmission amount, communication link number, sender address, and destination address. In the transmission time, a start time of the time-divided transmission band is stored. In the transmission amount, the amount of data that can be transmitted from the start time is stored. In the communication link number, a number for identifying a communication link is stored. In the sender address, the address of the slave station 20 or the master station 10 that uses the communication link for data transmission is stored. In the destination address, the address of the slave station 20 or the master station which receives data by using the communication link is stored. Here, the transmission amount, sender address, and destination address are information to be used when the communication link is established, which will be described later. Therefore, the transmission amount, sender address and destination address are blank if the transmission band is not yet in use. Note that, to indicate that the transmission band is not in use, the communication link number is set to 0, for example.

The ender portion is composed of information for use in well-known packet error detection.

This Map_Packet is generated based on scheduling (as will be described later) which is executed by the scheduler 15 every time a notification is made. Therefore, Map_Packet always makes an instruction about the optimal state of communications at the time of generation. The generated Map_Packet is provided to each slave station 20.

Figure 5A:
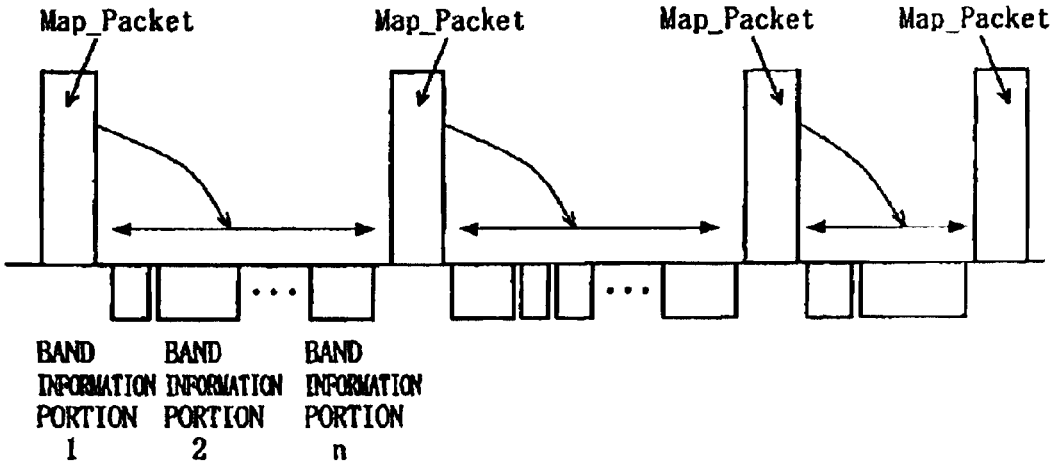
FIGS. 5A and 5B are diagrams each showing a relationship between the band assignment packet and an assigned transmission band.
Figure 5B:
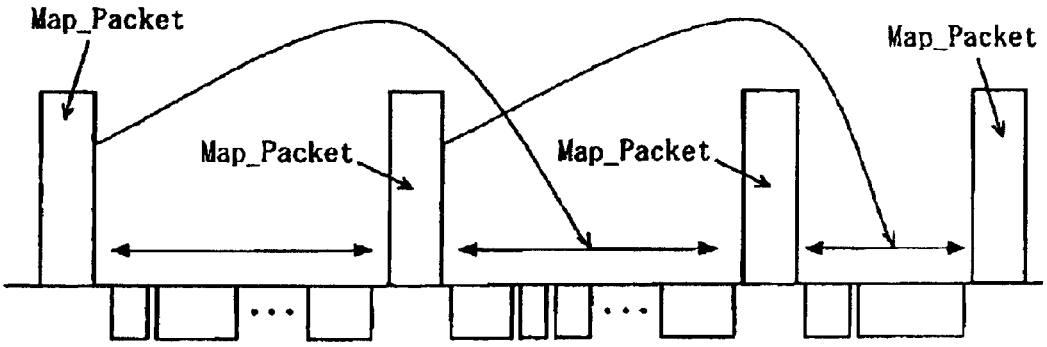

A relation between this Map_Packet and the transmission band is shown in FIGS. 5A and 5B. As shown in FIG. 5A, Map_Packet indicates how transmission bands that follow Map_Packet are assigned. Various packets hereinafter described are transmitted with the use of the transmission band that is assigned by Map_Packet. Also, as shown in FIG. 5B, if Map_Packet is for a transmission band that does not come immediately thereafter but after a short while, pipeline processing can be performed. Thus, it is possible to reduce possible waiting time when it takes an appreciable amount of time to carry out a transmission/receiving process, which improves efficiency.

Note that, either or both of a modulation scheme and error correction scheme used in Map_Packet transmission may be highly error proof so as to achieve a reliable transmission of Map_Packet to each slave station 20. Thus, access to the master station 10 from each slave station 20 can be ensured.

(2) Sending a Transmission Band Assignment Request from the Slave Station 20 to the Master Station 10

The operation of the slave station 20 upon receiving a new data transmission requested from the terminal which is connected thereto will now be described.

Figure 6:
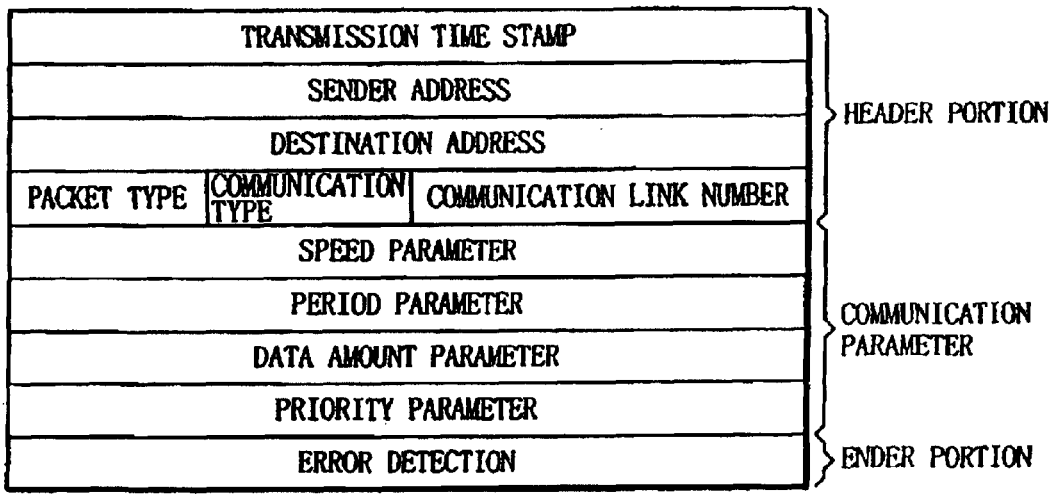
FIG. 6 is a diagram showing one example of structure of a request packet.

In this case, the slave station 20 analyzes information related to data that is newly requested for transmission (hereinafter, requested data) through the interface 21. With this analysis, the slave station 20 obtains information about the communication type, communication parameters (transmission amount, transmission speed, data period, and priority), and the destination of the requested data. Then, the slave station 20 transmits, to the master station 10, a request for assigning a transmission band for data transmission (allocating a communication link) together with the obtained information. For this request, a request packet (Request_Packet) shown in FIG. 6 is used. As shown in FIG. 6, the Request_Packet is composed of a transmission time stamp, sender address, destination address, packet type, communication type, communication link number, speed parameter, period parameter, data amount parameter, priority parameter, and error detection.

In the transmission time stamp, a time when Request_Packet is transmitted is stored based on a time counter of the slave station 20. In the sender address, the address of the slave station 20 that transmits Request_Packet is stored. In the destination address, the address of the master station 10 is stored. In the packet type, information indicating that this packet is Request_Packet is stored. In the communication type, any one of the above-described CBR, VBR, ABR, and UBR communication types is stored according to the requested data. Stored in the communication link number is a number which is provided to a communication link when the communication link is allocated, the number that the slave station 20 desires to use for identifying data transmission. By varying the communication link number, one slave station 20 can have a plurality of communication links at a time. In the speed parameter, information indicating a transmission speed of the requested data is stored. In the period parameter, information indicating a period of data occurrence in the requested data is stored. In the data amount parameter, information indicating the transmission amount of the requested data is stored. In the priority parameter, information about a level of priority that the requested data deserves for transmission band assignment is stored. Note that the priority parameter is not necessarily required.

After generating Request_Packet for the requested data, the slave station 20 refers to Map_Packet which is received from the master station 10, and transmits Request_Packet to the master station 10 by using a transmission band to which a new assignment request is directed (an unused transmission band). More specifically, the slave station 20 finds any band information portion whose communication link number indicates that the band is not in use (0, in the above example). Then, the slave station 20 transmits Request_Packet to the master station 10 at the transmission time of the found band information portion (arbitrary one if two or more band information portions are found).

Note that, if the master station 10 itself newly receives a data transmission request from the terminal connected thereto, the transmission and receiving of Request_Packet is not carried out.

In an initial state, each slave station 20 is not synchronized in time with the master station 10. Therefore, in order to transmit Request_Packet at the transmission time which is indicated by Map_Packet, the slave station 20 has to be synchronized in time with the master station 10. Here, time synchronization means that the time counter which is included in the controller 22 of the slave station 20 is synchronized with the time counter which is included in the controller 12 of the master station 10.

Figure 7:
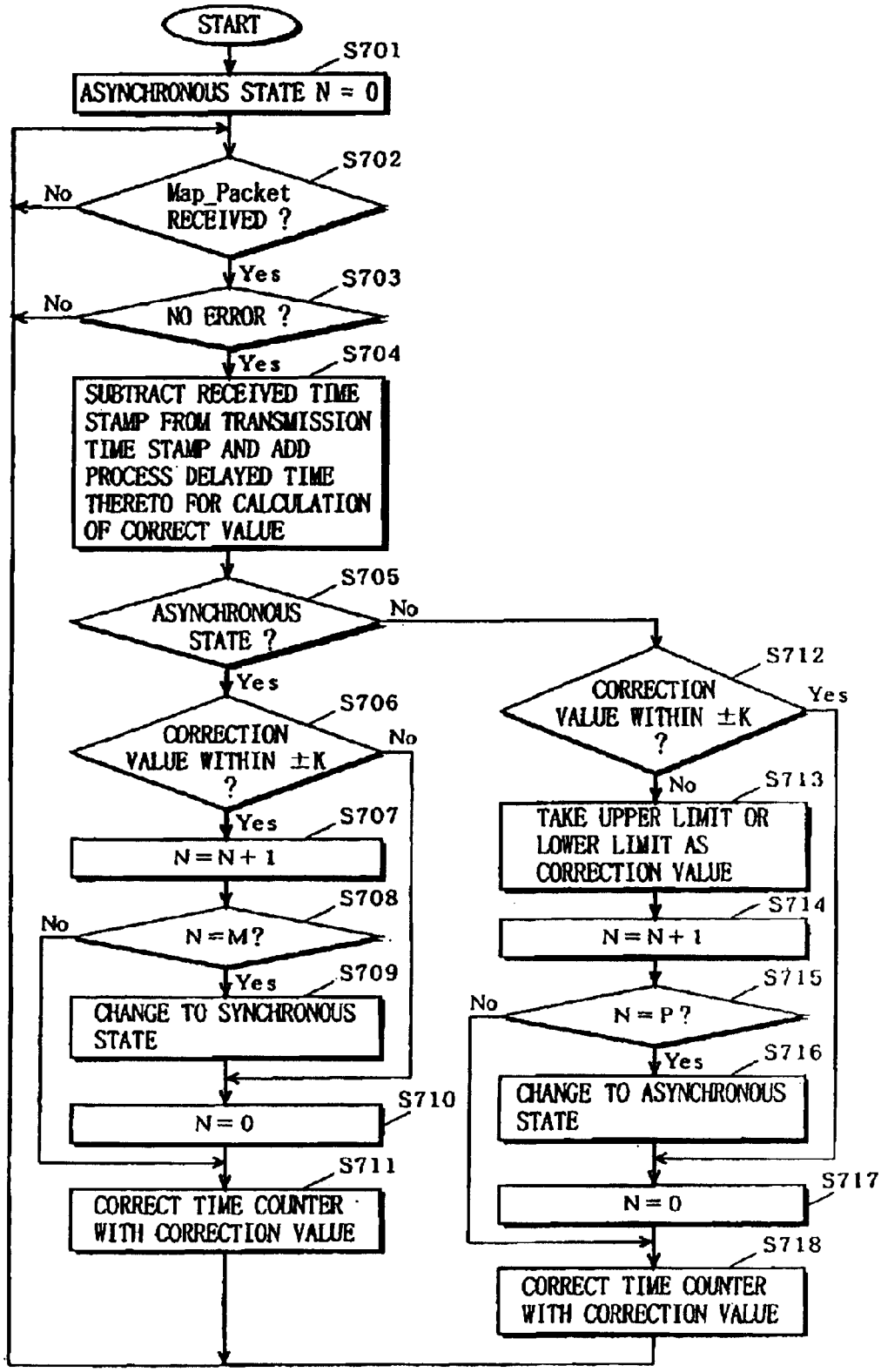
FIG. 7 is a flowchart showing a time synchronization process that is carried out by the slave station 20.

Hereinafter, the synchronization between both time counters of the master station 10 and the slave station 20 is specifically described with reference to FIG. 7.

When receiving Map_Packet from the master station 10 without error (steps S702, S703), the packet receiver 24 of each slave station 20 outputs Map_Packet together with a time stamp indicating a receive time (hereinafter, receive time stamp) to the controller 22. The controller 22 calculates a time difference between the transmission time stamp that is provided to Map_Packet and the receive time stamp, and then adds thereto a fixed process delay time due to modulation/demodulation and the like which is involved in data transmission for calculating a correction value (step S704). The slave station 20 then corrects its own time counter with the correction value (step S711). This correction value is calculated each time the slave station 20 receives Map_Packet. When the correction value falls within a predetermined range ±K (which is equivalent to an allowable space propagation delay time) a predetermined number of times M successively, it is determined that synchronization is established (steps S706 through S709). In an asynchronous state, Request_Packet cannot be transmitted correctly at the transmission time that is indicated by Map_Packet. Therefore, transmission of Request_Packet from the slave station 20 is prohibited.

Even after time synchronization is established, the controller 22 calculates the correction value. If the calculated correction value does not fall within the predetermined range ±K, an upper limit +K or a lower limit −K is taken as an effective correction value for actual use (steps S712, S713). For example, assume that K=40 ms. When the calculated correction value is −50 ms, −40 ms is taken as the effective correction value, and when the calculated correction value is 60 ms, 40 ms is taken as the effective correction value. Note that the time counter may be managed with the number of reference clocks in the system. The slave station 20 then corrects its own time counter with the effective correction value (step S718). If this effective correction value does not fall within the predetermined range ±K, a predetermined number of times P successively, it is determined that asynchronization is established (steps S714 through S716)

With the above-described process, the master station 10 and each slave station 20 are synchronized in time.

Furthermore, the timing of packet transmission may be finely adjusted with packet transmission and receiving after time synchronization. This fine adjustment is done by measuring a variable space propagation delay time and correcting the timing, which improves synchronization accuracy.

Figure 8:
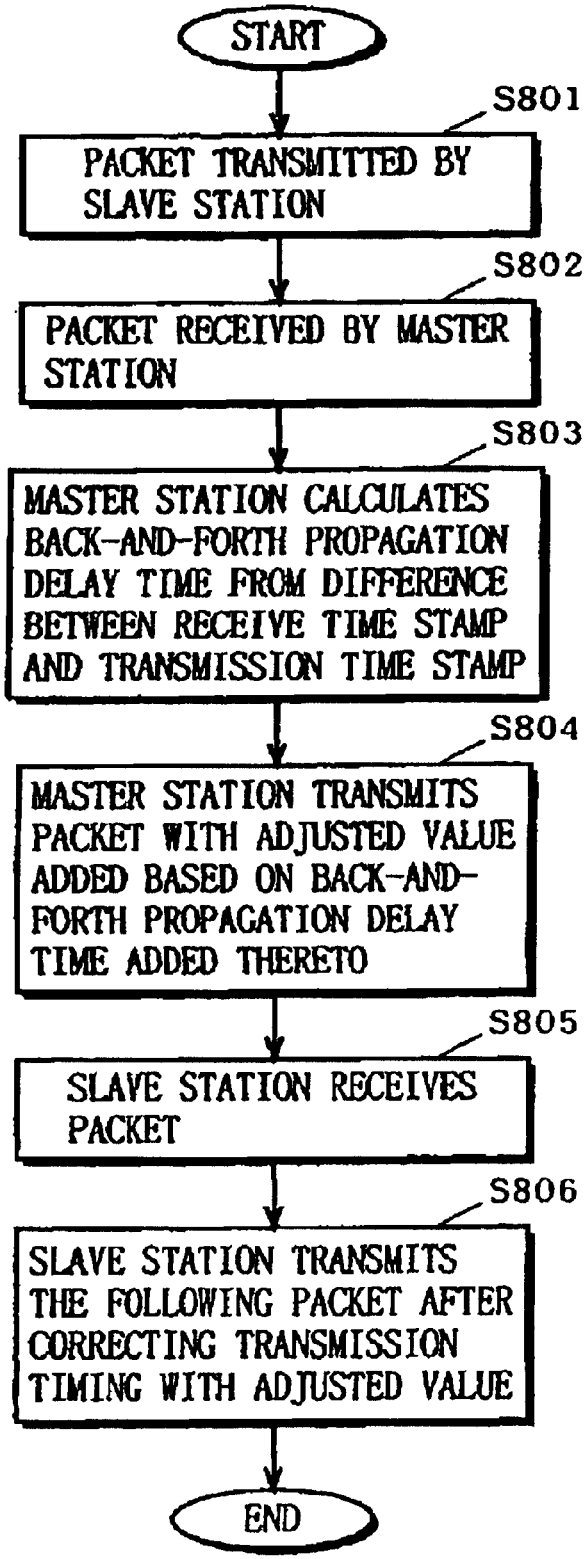
FIG. 8 is a flow chart showing a fine adjustment process for transmission timing that is carried out by the master station 10.

How the transmission timing is finely adjusted will now be specifically described below with reference to FIG. 8.

When receiving a packet (Request_Packet, for example) from any slave station 20, the master station 10 outputs the packet together with the receive time stamp indicating a receive time to the controller 12 (step S802). The controller 12 calculates a time difference Td between the transmission time stamps that are provided to the packet and the receive time stamp (step S803) The values of the time counters of the master station 10 and the slave station 20 originally differ for the space propagation delay time due to the above time synchronization using Map_Packet. Therefore, the time difference Td is equivalent to a space propagation delay time that is taken for a single exchange of data (a back-and-forth space propagation delay time). An adjusted value based on this back-and-forth space propagation delay time is added to Map_Packet, for example, and given from the master station 10 to each slave station 20 (step S804). Each slave station 20 corrects packet transmission timing thereafter based on the given adjusted value (step S806).

When the master station 10 gives the adjusted value, the scheduler 15 of the master station 10 deletes a band that can be deleted with the adjusted value (which is equivalent to a time period when any packet is not transmitted) from currently-assigned bands.

As described above, the master station 10 sets the broadcast address as the destination address for Map_Packet. Therefore, two or more slave stations 20 might simultaneously transmit Request_Packet to the same unused transmission band. Thus, how to avoid such access concentration is now described.

The master station 10 transmits, to each slave station 20, Map_Packet with a predetermined probability parameter Ap that is added to each band information portion. Note that the communication link number may be replaced by the probability parameter Ap. This probability parameter Ap is a variable for suppressing the number of accesses from the slave stations 20. On the other hand, each slave station 20 generates a random number Cp within a predetermined range of values which the probability parameter Ap can take. The slave station 20 is adapted to be able to transmit Request_Packet only to the transmission band whose probability parameter Ap exceeds the random number Cp (Ap>Cp). For example, if the probability parameter AP is "512", the slave station 20 can transmit Request_Packet when the generated random number Cp is "100", while the slave station 20 cannot transmit Request_Packet when the generated random number Cp is "700". Thus, access concentration on one transmission band can be avoided.

Note that a receive error of Request_Packet in each transmission band may be measured for adjusting the frequency of access. In this case, the probability parameter Ap is decreased if a number of errors are found, while the probability parameter Ap increased if only a few errors are discovered.

(3) Transmission Band Assignment Process by the Master Station 10

Next, the transmission band assignment process (scheduling) which is carried out by the master station 10 that receives Request_Packet from the slave station 20 and that gives Map_Packet at predetermined intervals is described with reference to FIGS. 9 through 12.

Figure 9:
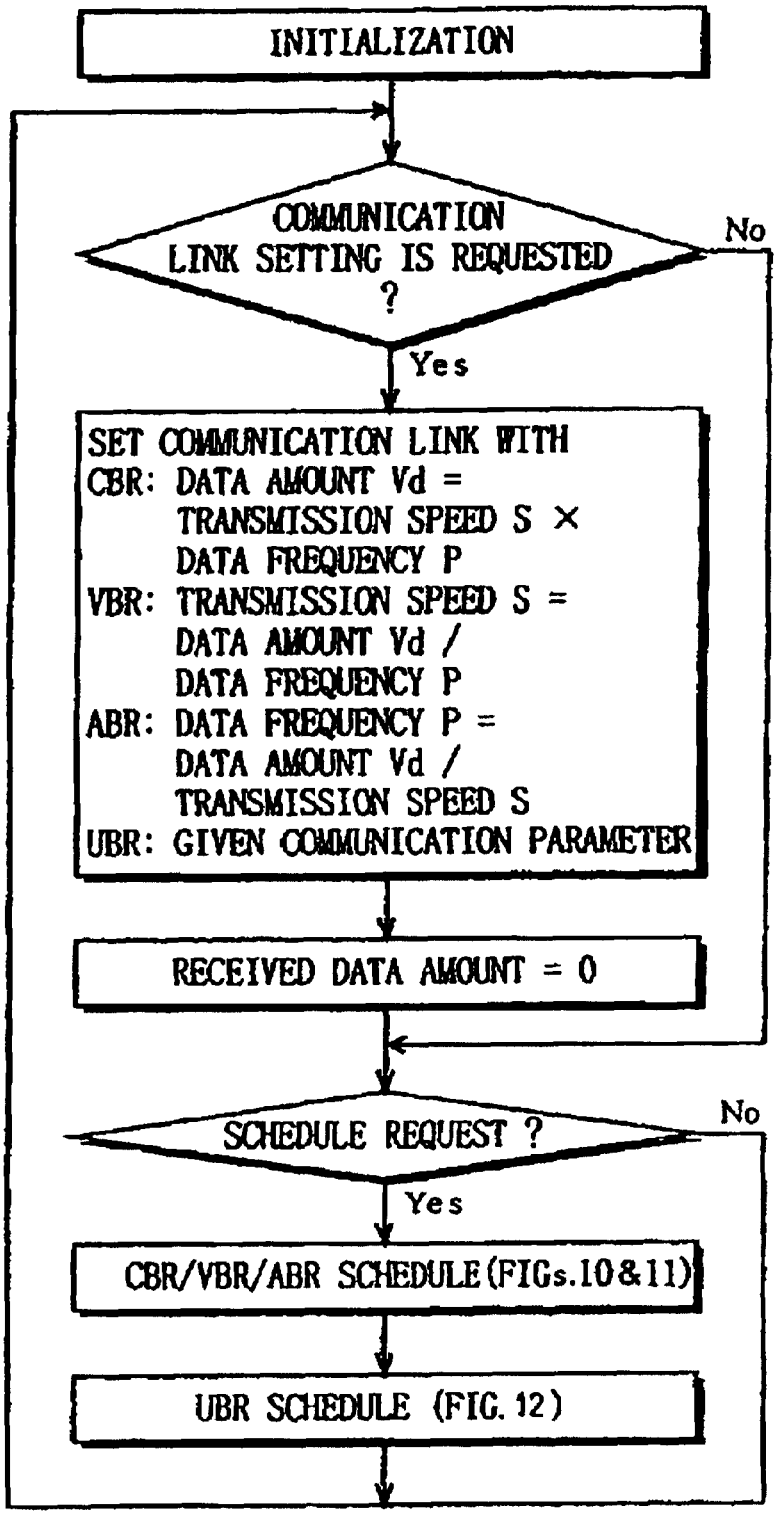
FIG. 9 is a flowchart showing a transmission band assignment process that is carried out by the master station 10.

When receiving Request_Packet from the slave station 20, the master station 10 carries out scheduling for setting a new communication link based on the received Request_Packet. Also, when giving Map_Packet at the predetermined intervals, the master station 10 carries out scheduling for resetting the existing communication link based on a respond packet, which will be described later. Scheduling is carried out by the scheduler 15 according to an instruction that is received from the controller 12. Here, when receiving Request_Packet, the communication parameters which are provided to the master station 10 vary with the communication type of the requested data. Therefore, the scheduler 15 carries out, in advance, a process as described below (FIG. 9).

For CBR, a speed parameter S and a period parameter P are provided. Therefore, the scheduler 15 calculates a data amount parameter Vd (=S×P) from these provided parameters. For example, when S=6 Mbps and P=33 ms, $6\times10^6)\times(33\times10^{-3})=198000$ bits (24750 bytes).

For VBR, the period parameter P and the data amount parameter Vd are provided. Therefore, the scheduler 15 calculates the speed parameter S (=Vd/P) from these provided parameters. For example, when P=50 ms and Vd=32000 bits (4000 bytes), $32000/(50\times10^{-3})=640$ kbps.

For ABR, the speed parameter S and the data amount parameter Vd are provided. Therefore, the scheduler 15 calculates the period parameter P (=Vd/S) from these provided parameters. For example, when S=3 Mbps and Vd=24000 bits (3000 bytes), $24000/(3\times10^6)=8$ ms.

For CBR, VBR, or ABR, the scheduler 15 checks to see if there is any transmission bandwidth not in use (an empty bandwidth Be). The scheduler 15 holds a sum of values of the speed parameters S of the already-allocated communication links, which is equivalent to a used bandwidth Bu. Therefore, the empty bandwidth Be can be calculated by subtracting the used bandwidth Bu from an effective transmission bandwidth Br. Here, the effective transmission bandwidth Br is obtained by subtracting an overhead bandwidth Bo from an entire transmission bandwidth Bs of the system. The bandwidth Bo includes loss bands due to overhead which is involved in packet transmission, packet error, and scheduling error (ideal scheduling cannot be done), and a band reserved for UBR data transmission. Note that the bandwidth Bo may be dynamically changed based on the level of communication quality that is determined in consideration of transmission error, measured receive field intensity, and the like.

If the empty bandwidth Be is found, the scheduler 15 then determines whether the speed parameter S, which is equivalent to a requested transmission bandwidth Bl, exceeds the empty bandwidth Be. If the speed parameter S exceeds the empty bandwidth Be, transmission band assignment is difficult. Therefore, the scheduler 15 rejects a link setting request by Request_Packet from the slave station 20. On the other hand, if the speed parameter S does not exceed the empty bandwidth Be, a new transmission band assignment can be made. Therefore, the scheduler 15 receives the setting request and updates the used bandwidth Bu (Bu←Bu+Bl).

Note that an upper limit of the bandwidth that can be used for data of CBR, VBR, and ABR may be set. If the used bandwidth Bu exceeds this upper limit, the setting request is rejected. Also, in this case, it is required to calculate a time when the data that is indicated by the data amount parameter Vd should be completely received by a receiving side (completion time Te). The scheduler 15 obtains the completion time Te by adding the period parameter P to the present time. The present time may be a transmission time of the transmission band which is assigned by scheduling. Also, the scheduler 15 manages a received data amount Vdr (initial value=0) indicating how much requested data has been received by the receiving side.

On the other hand, for UBR, the scheduler 15 receives the setting request without checking the empty bandwidth Be. For UBR, any communication parameters are normally not provided. In some cases, however, the data amount parameter Vd, the period parameter P, and the priority parameter E may be provided.

Figure 10:
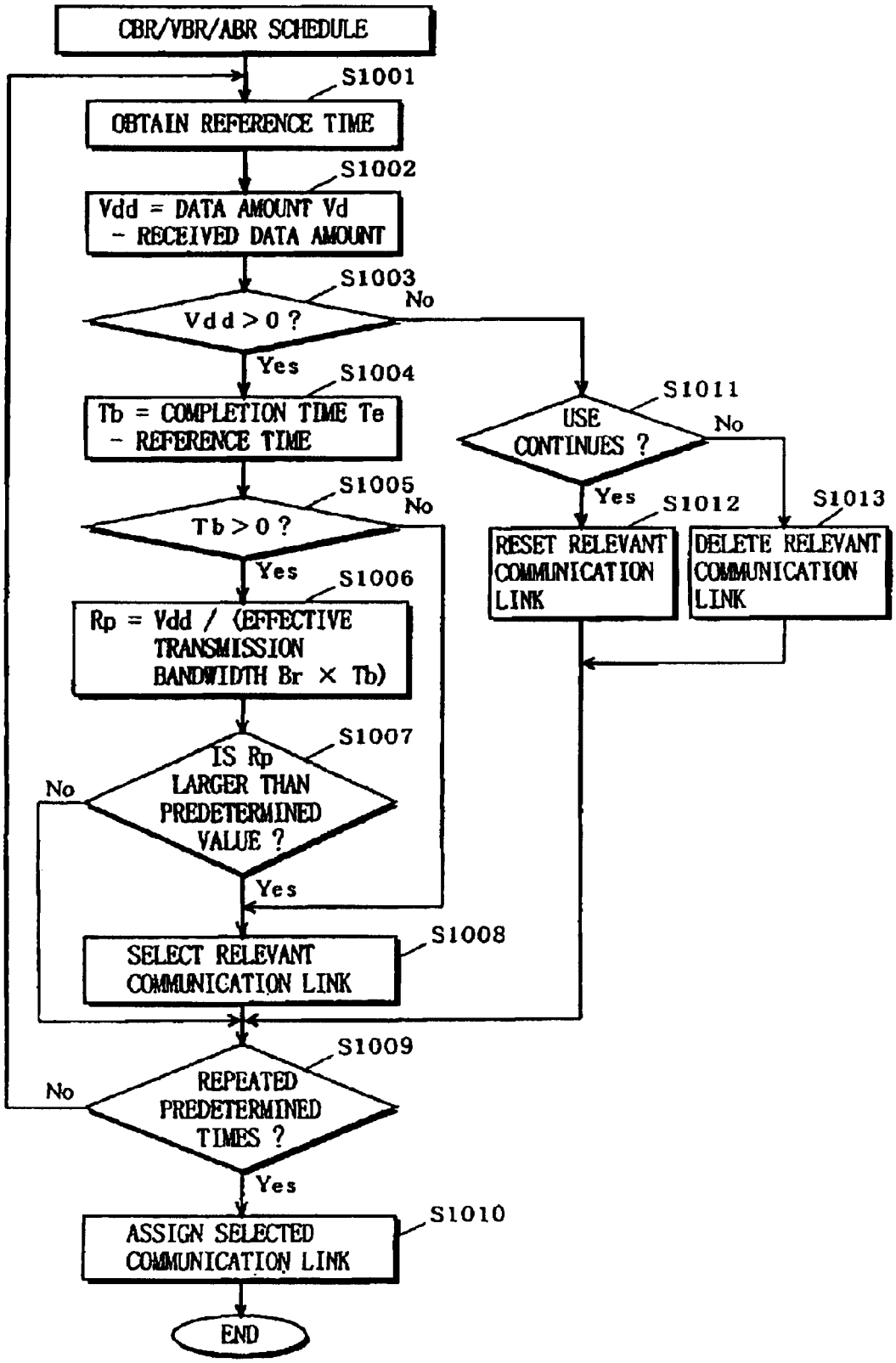
FIGS. 10 and 11 are flow charts each showing the scheduling of CBR/VBR/ABR data of FIG. 9 in detail.

With reference to FIG. 10, a scheduling process to be executed for CBR, VBR, or ABR when the setting request is received and when communication links are reset is described. In this case, the scheduler 15 obtains a reference time (step S1001). The scheduler 15 then calculates a difference Vdd between the data amount parameter Vd that is provided as the communication parameter and the received data amount Vdr (step S1002).

If the difference Vdd is not more than 0 (Vdd≦0), it is determined that the receiving side has completely received the data. Therefore, setting of a communication link for this transmission data is deleted from a schedule. If data transmission continues, however, this setting is not deleted from the schedule. In this case, the received data amount Vdr is initialized back to 0, and a new completion time Te is calculated by adding the period parameter P to the present time, thereby achieving continuous data transmission without resetting (steps S1011 and S1013). Nevertheless, the above-described setting may be once deleted from the schedule, and then a new setting may be made, taking the communication type as UBR with the sender address and destination address unchanged. In this case, the slave station 20 which is specified by the sender address can exclusively transmit Request_Packet from the new setting onward.

The scheduler 15 then calculates a difference Tb between the completion time Te of the transmission data and the obtained reference time (step S1004). If the difference Tb does not become more than 0 (Tb≦0), the scheduler 15 selects one or more transmission data which is predetermined in increasing order of the difference Tb as an object for communication link assignment (resetting) (steps S1005 and S1008). Note that the reference time may be the transmission time of the assigned transmission band. On the other hand, if the difference Tb exceeds 0 (Tb>0), the scheduler 15 multiplies the difference Tb by the effective transmission bandwidth Br so as to calculate a maximum transmission amount Vm (=Tb×Br). The scheduler 15 further divides the difference Vdd by the maximum transmission amount Vm so as to calculate priority Rp (=Vdd/Vm) (step (S1006). When the priority Rp is not less than a predetermined value, the scheduler 15 selects one or more transmission data which are predetermined in decreasing order of the priority Rp as an object for communication link assignment (resetting) (steps S1007, S1008). Thus, dynamic scheduling can be carried out by giving a high priority to transmission data which includes an appreciable amount of data which as not been transmitted with respect to the completion time Te.

After the above-described process has been performed repeatedly a predetermined number of times, communication link assignment (resetting) for the selected transmission data of CBR, VBR, or ABR is carried out (steps S1009, S1010).

Figure 11:
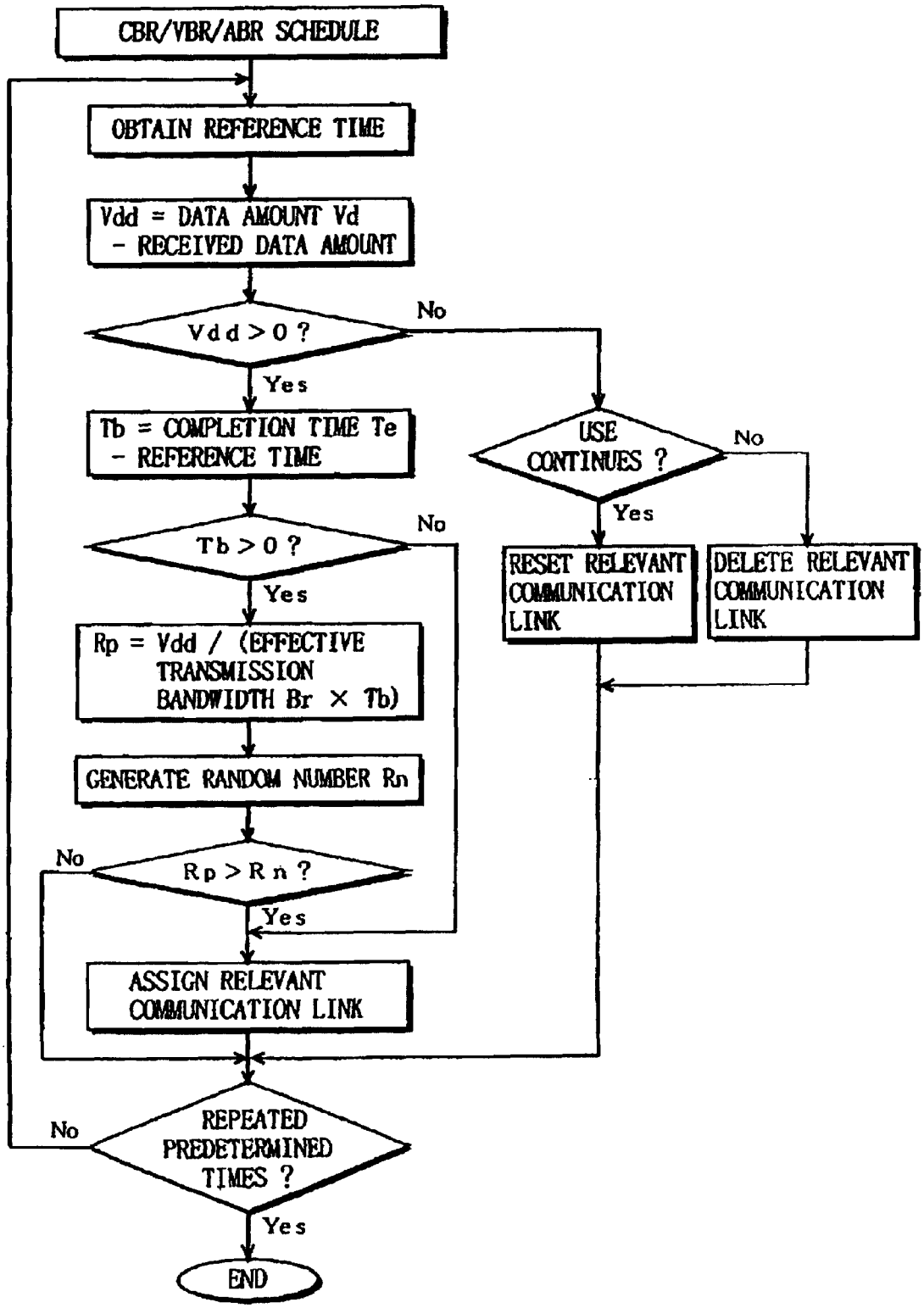

Note that a random number Rn (Rn=0 to 1) within a range of values that the priority Rp can take may be generated. Then, a comparison is made between the priority number Rp and the random number Rn, and a transmission link assignment (resetting) may be carried out only for the transmission data whose priority Rp exceeds the random number Rn (Rp>Rn) (FIG. 11). With this process, scheduling can be simplified.

Figure 12:
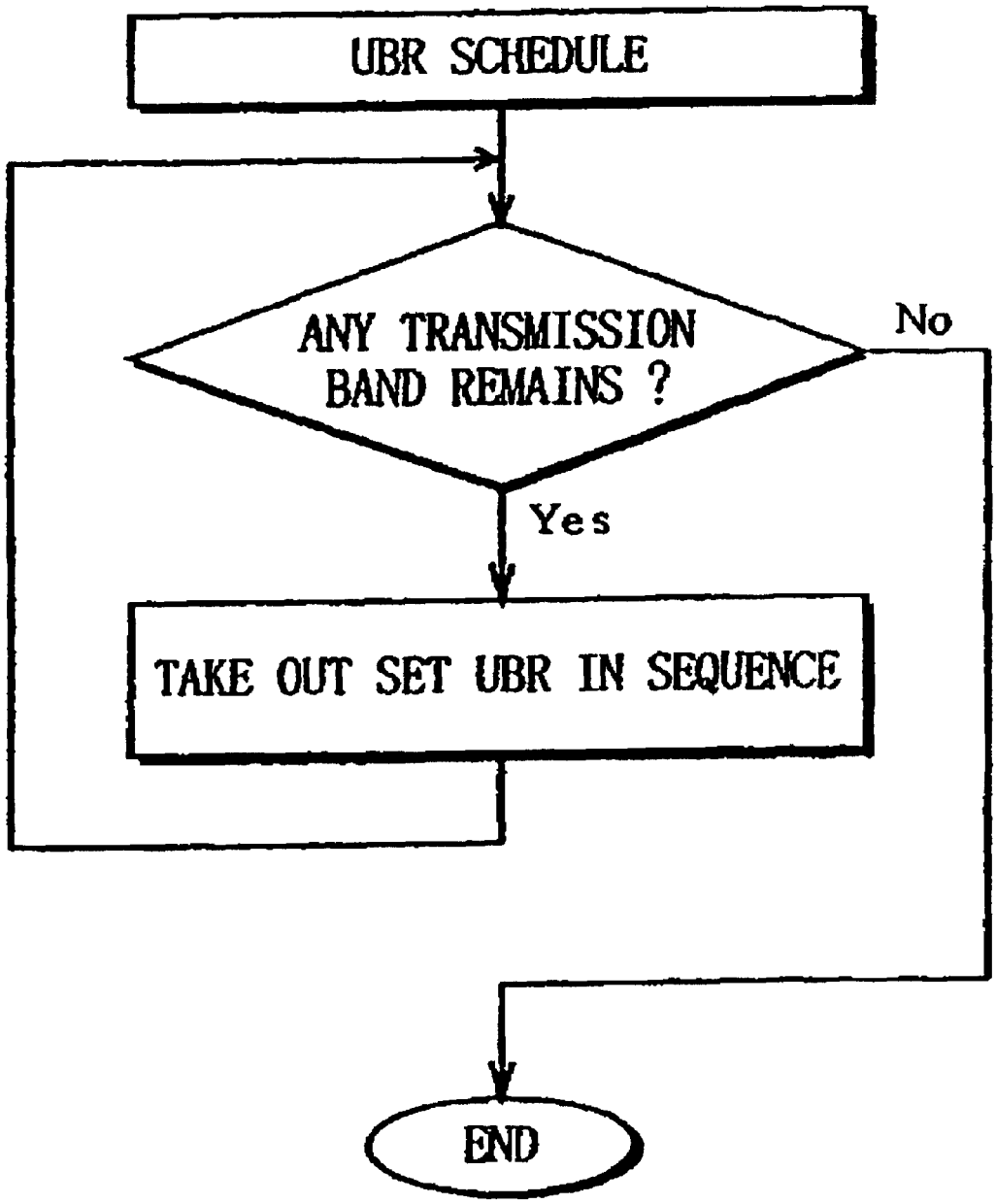
FIG. 12 is a flow chart showing the scheduling of UBR data of FIG. 9 in detail.

Then, after an assignment for the transmission data of CBR, VBR, or ABR, transmission data of UBR is assigned to the transmission band that remains without an allocated communication link (FIG. 12).

With reference to FIG. 12, a scheduling process to be executed for UBR when the setting request is received and when communication links are reset will now be described. In this case, the scheduler 15 schedules the transmission data of UBR in sequence or based on the priority parameter E at the time of communication link setting. At this time, the transmission data with the higher priority parameter E is given a higher priority to be scheduled. Alternatively, the scheduler 15 calculates the difference Tb between the completion time Te of the transmission data and the reference time, and schedules the transmission data of UBR only if the difference Tb is not more than 0.

Note that, if the data amount parameter Vd is provided as the information for the transmission data of UBR, the scheduler 15 calculates the difference Vdd between the provided data amount parameter Vd and the received data amount Vdr. If the difference Vdd is not more than 0, it is determined that the data has been completely received by the receiving side. Therefore, setting of the communication link for this transmission data is deleted from the schedule.

Examples of methods for assigning (changing) the transmission amount on each communication link at the time of scheduling will now be described below.

A first method is to assign the transmission amount by a fixed length. In this first method, load on the scheduler 15 can be reduced. If the amount of data to be transmitted is small, however, the transmission band is wasted.

A second method is to change the assignment of the transmission amount so that packet lengths which are obtained by dividing the data amount parameter Vd become equal. In this case, upper and lower limits may be set for a transmission amount assignment. In this second method, contrary to the first method, the transmission band is not wasted, but load on the scheduler 15 is increased.

A third method is to decrease the assignment of the transmission amount when more errors occur, and to increase the assignment of the transmission amount when fewer errors occur, according to the communication quality on the wireless channel. In this third method, the transmission band for use in re-transmission is reduced if the assignment of the transmission amount is small, while the transmission band which is equivalent to overhead for packet processing can be substantially reduced if large. However, if a steep variation in error is observed and a change of assignment of the transmission amount cannot follow the variation, the transmission band is instead wasted.

A fourth method is to increase an assignment of the transmission amount so that the same packet can be successively transmitted when the communication quality of a wireless channel is extremely low. The fourth method is extremely error proof, but the transmission band consumed is extremely large.

After the above-described scheduling, the master station 10 generates changed Map_Packet, and gives Map_Packet to each slave station 20.

Note that the master station 10 determines that the transmission band is not in use when the assigned transmission band has not been accessed successively M times or if a time T has passed, and reflects this determination result onto scheduling. Here, the number of times M and the time T may be fixed parameters or may be set for each communication link. However, for the transmission band for receiving Request_Packet (unused transmission band), the assignment is not deleted even though the transmission band is not accessed. This is to ensure the transmission band for regularly receiving Request_Packet.

(4) Data Transmission Based on Scheduling by the Master Station 10

Data transmission which is carried out by the slave station 20 that transmits Request_Packet and then receives the scheduled Map_Packet from the master station 10 will now be described.

Figure 13:
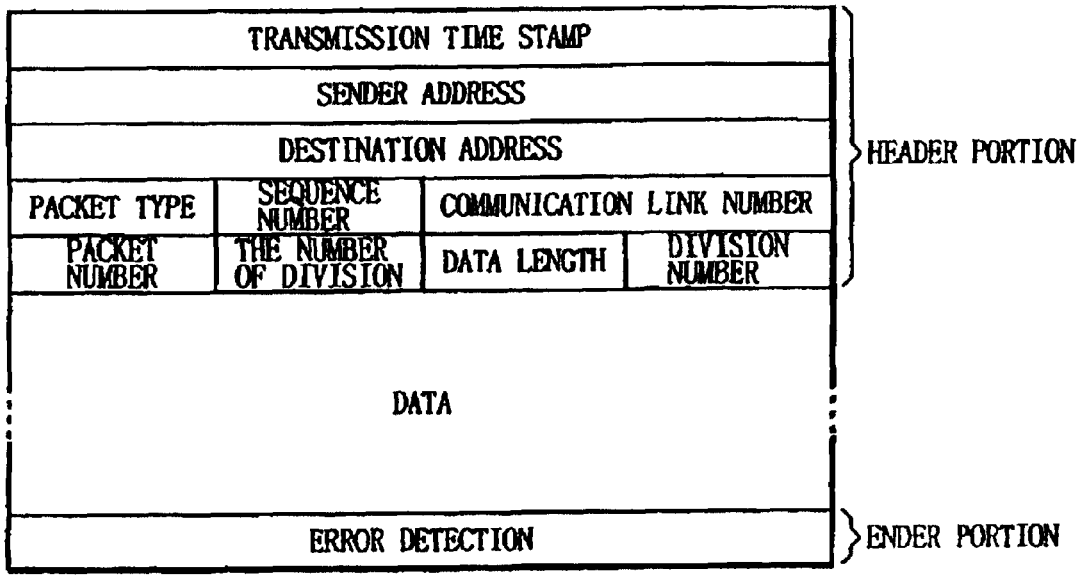
FIG. 13 is a diagram showing one example of the structure of a data packet.

When receiving Map_Packet from the master station 10, the slave station 20 checks to see if any transmission band can be assigned to the requested data. This check can be done with the communication link number and sender address in each band information portion of Map_Packet. For example, an assignment can be done when the communication link number in the band information of Map_Packet coincides with the communication link number of the transmitted Request_Packet, or when the address of the slave station 20 is stored in the sender address. If the transmission band is assigned, the slave station 20 transmits the transmission data to a receiving side. For this transmission, a data packet (Data_Packet) shown in FIG. 13 is used. As shown in FIG. 13, Data_Packet is composed of a header portion, a data portion, and an ender portion.

The header portion is composed of a transmission time stamp, sender address, destination address, packet type, sequence number, communication link number, packet number, the number of divisions, data length, and division number. In the transmission time stamp, based on the time counter of the slave station 20, a time when Data_Packet is transmitted, that is, a transmission time of the assigned transmission band, is stored. In the sender address, the address of the slave station 20 that transmits Data_Packet (hereinafter, transmitting station) is stored. In the destination address, the address of the slave station 20 or the master station 10 that will receive the transmission data (hereinafter, receiving station) is stored. In the packet type, information indicating that this packet is Data_Packet is stored. In the sequence number, a serial number which is provided to each Data_Packet is stored. In the communication link number, a communication link number of the assigned transmission band is stored. In the packet number, a serial number of an input packet which is provided by the terminal is stored. In the number of divisions, the number in which the input packet is divided for transmission as Data_Packet is stored. In the data length, the length of the data portion is stored. In the division number, a serial number which is provided to each segment packet that is obtained by division is stored.

In the data portion, the entire or part of the transmission data is stored based on the transmission amount of the assigned transmission band.

The ender portion is composed of information for use in well-known packet error detection.

The transmitting station uses the assigned transmission band so as to generate the above-described Data_Packet for each segment packet based on the specified transmission amount. The transmitting station then sequentially transmits Data_Packet in a specified transmission timing (at transmission time), thereby transmitting the requested data to the receiving station.

Note that, when the slave station 20 is the receiving station, that is, when the address of the slave station 20 is the destination address in the band information portion of Map_Packet, the slave station 20 may intermittently receive the transmission data in accordance with a receive timing thereof or that of the following Map_Packet. Here, in intermittent receiving, main components for carrying out wireless processing, control processing, and other processing are made to operate only when receiving a packet, thereby achieving a reduction in power consumption. However, when not receiving Map_Packet correctly, the slave station 20 does not perform intermittent receiving until the slave station 20 can receive a next-coming Map_Packet correctly.

(5) Acknowledgement to the Received Transmission Data

The transmission of an acknowledgement concerning a state of data transmission to the slave station 20 as the transmitting station and the master station 10 which is carried out by the receiving station (the slave station 20 or the master station 10) that has received Data_Packet will now be described.

Figure 14:
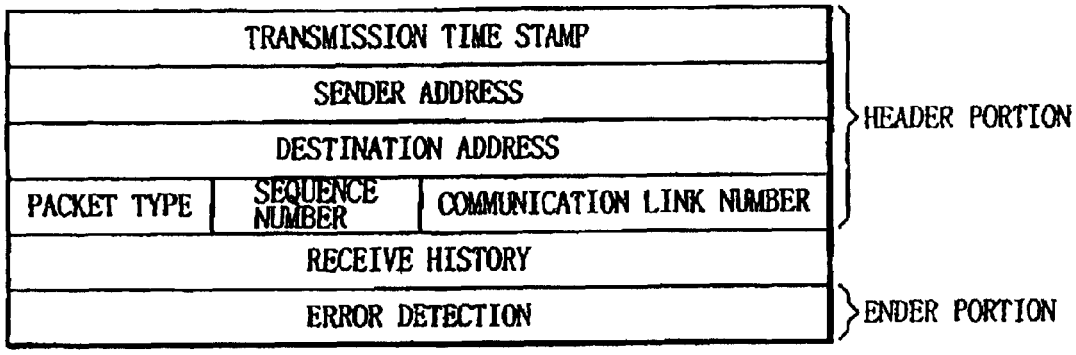
FIG. 14 is a diagram showing one example of the structure of an acknowledgement packet.

When receiving Data_Packet from the transmitting station, the receiving station gives a state of data transmission (receiving state) in predetermined timing to the slave station 20 as the transmitting station and the master slave 10. If the transmitting station is the master station 10, the receiving state is given only to the master station 10. To give the receiving state, an acknowledge packet (hereinafter, Ack_Packet) shown in FIG. 14 is used. As shown in FIG. 14, Ack_Packet is composed of a transmission time stamp, sender address, destination address, packet type, sequence number, communication link number, receive history, and error detection.

In the transmission time stamp, a time when Ack_Packet was transmitted is stored based on the time counter of the receiving station. In the sender address, the address of the receiving station, which sends Ack_Packet, is stored. In the destination address, the addresses of the transmitting station and the master station 10 are stored. In the packet type, information indicating the packet is the Ack_Packet is stored. In the sequence number, the transmission sequence number which is provided to the latest Data_Packet that was normally received is stored in its current form. In the communication link number, the communication link number of the received Data_Packet is stored as it is. In the receive history, information indicating Data_Packet normally received before the sequence number is stored. For example, if the receive history is represented by 32 bits when the sequence number is "50", each of 32 bits of the previous sequence numbers 49 and 18 is stored with "1" assigned when Data_Packet was normally received, and "0" when otherwise. In the error detection, information for use in well-known packet error detection is stored.

The receiving station then transmits the above-described Ack_Packet to the slave station 20 as the transmitting station and the master station 10 in predetermined timing which will be described below.

At scheduling, the master station 10 assigns, in advance, unused transmission band for Ack_Packet transmission. Therefore, the receiving station can transmit the Ack_Packet in a transmission timing of the assigned transmission band.

On the other hand, when any transmission band cannot be assigned for Ack_Packet transmission in the above-described manner, the transmission band which is used for Data_Packet transmission is also used for Ack_Packet transmission. For example, when Data_Packet is transmitted from the transmitting station to the receiving station i times (ten times, for example), Ack_Packet is transmitted from the receiving station to the transmitting station next one time. In this case, which station can use the transmission band is instructed with Map_Packet from the master station 10. Note that the number of times i may be set for each communication link (transmission band). Moreover, based on the communication quality of the wireless channel, the number of times i is dynamically changed so as to be decreased when more errors are observed, and increased when fewer errors are observed.

(6) Operation of the Transmitting Station or the Master Station 10 that Received Ack_Packet The operation of the transmitting station or the master station 10 that received Ack_Packet will now be described.

When receiving Ack_Packet, the slave station 20, as the transmitting station, checks a sequence number R and receive history stored in Ack_Packet. First, the transmitting station determines whether a difference between a sequence number R' that was previously received and the sequence number R which is currently received (R–R') exceeds the capacity of the receive history (the number of information stored in the receive history). If the difference exceeds the capacity of the receive history, the transmitting station sets the sequence number to be stored back to (R'+1) for Data_Packet re-transmission. Such cases occur when an error in receiving Ack_Packet successively occurs at the transmitting station, for example, meaning that a state of receiving Data_Packet between the sequence numbers R' and R at the receiving station is unknown. For this reason, the transmitting station carries out re-transmission starting from Data_Packet coming next to the already-received one with the sequence number R'. On the other hand, if the difference does not exceed the capacity of the receive history, the transmitting station checks the receive history. Here, the Data_Packet corresponding to the sequence number whose bit of the receive history indicates "0" means that the receiving station has not yet received this Data_Packet. Therefore, the transmitting station first carries out re-transmission of Data_Packet starting from the one with the oldest sequence number. Then, after all Data_Packet which are required to be re-transmitted have been completely re-transmitted, normal transmission starts again from Data_Packet with the sequence number R before re-transmission.

With the above-described process, when fewer receiving errors are found, only Data_Packet with a discovered error is re-transmitted. When more receiving errors are found, that is, when the number of erroneous packets exceeds the capacity of the receive history, re-transmission is started from the first erroneous Data_Packet. Thus, an efficient error re-transmission control can be performed.

On the other hand, when the master station 10 receives Ack_Packet, the controller 12 of the master station 10 checks the sequence number R and the receive history stored in Ack_Packet. The controller 12 then calculates the amount of data which is normally received by the receiving station with consideration of the variation in the data amount due to re-transmission, and gives the calculated data amount to the scheduler 15. The scheduler 15 updates the given data amount as the received data amount Vdr. Thus, a state of data receiving can be reflected on the next scheduling.

As stated above, in the wireless communications system according to the embodiment of the present embodiment, the scheduling result of the scheduler 15, that is, the result of transmission band assignment, is regularly given to each slave station 20 by the master station 10 with the band assignment packet, and is also recognized by the master station 10. Data transmission is carried out between stations with transmission band assigned thereto. Thus, any requested data of CBR, VBR, ABR, or UBR can be transmitted between stations.

Figure 15:
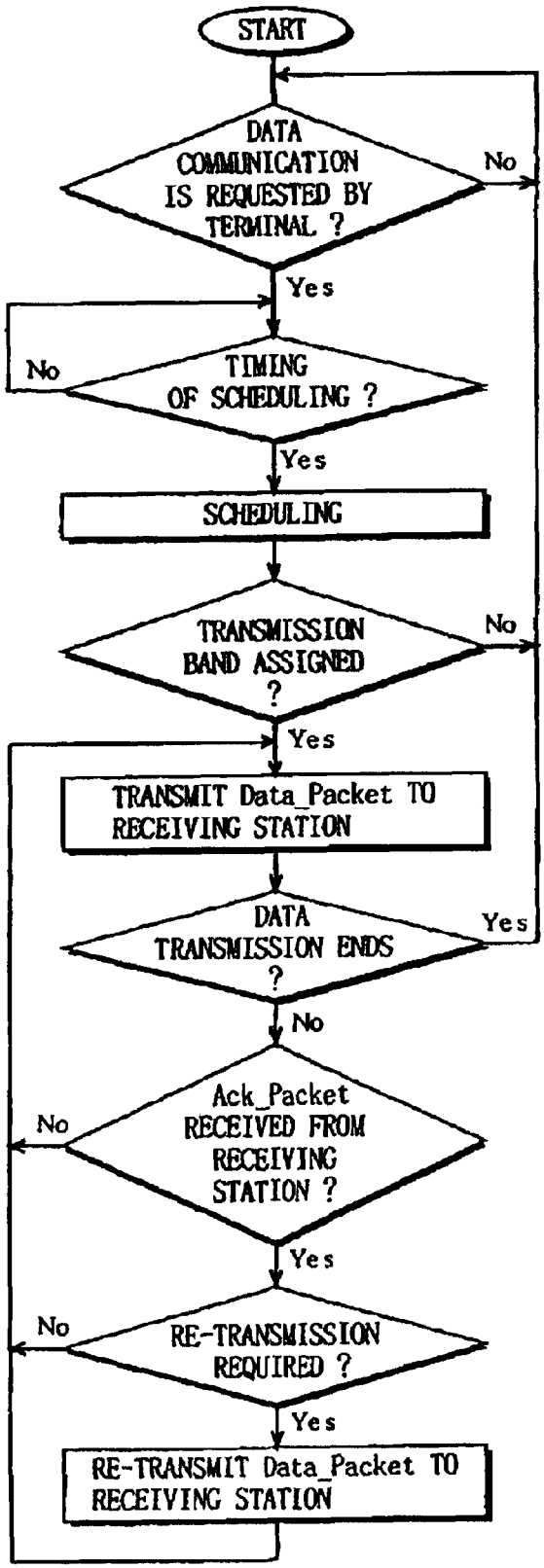
FIG. 15 is a flow chart showing a process that is carried out by the master station 10 as a transmitting station.
Figure 16:
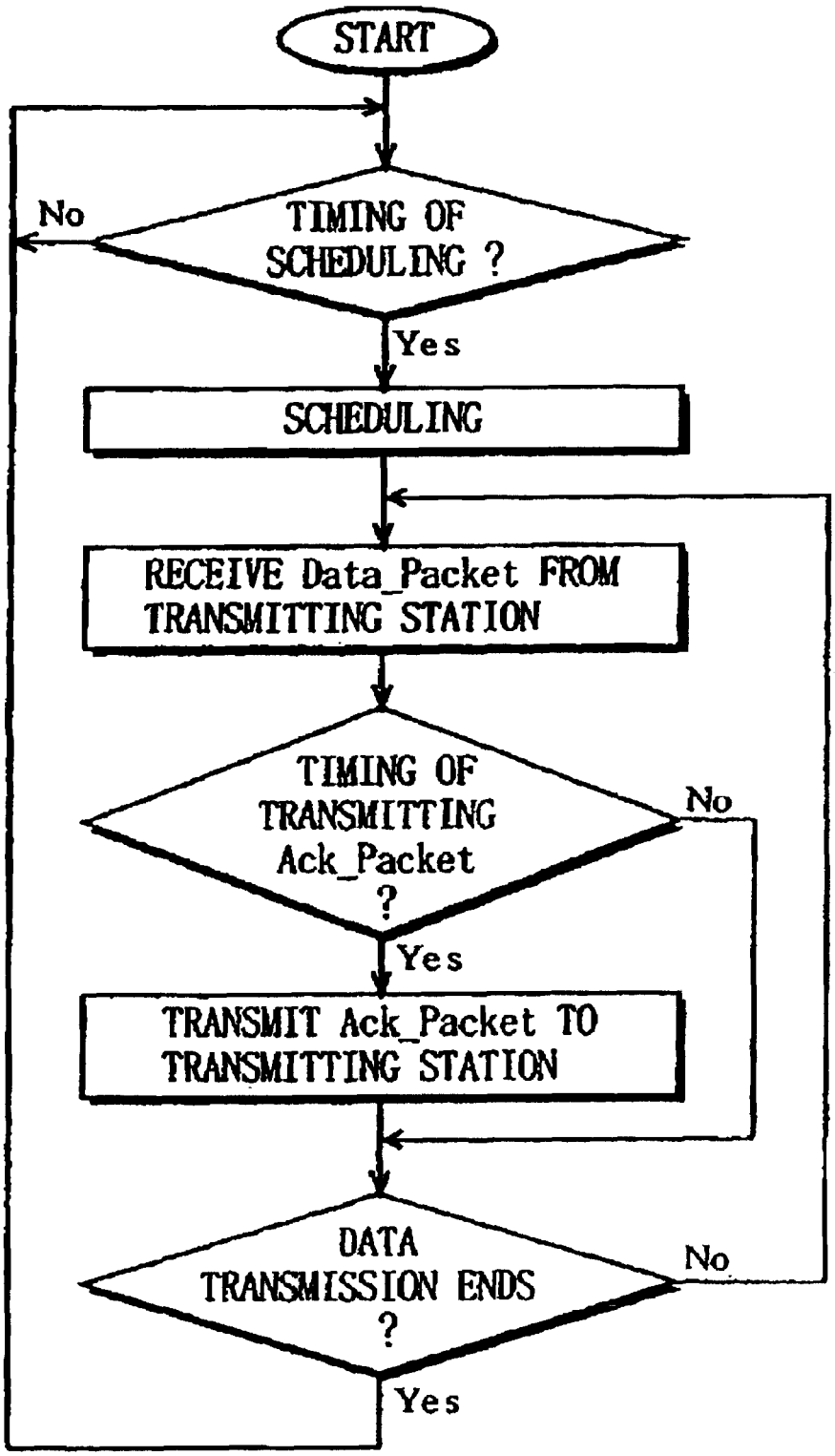
FIG. 16 is a flow chart showing a process that is carried out by the master station 10 as a receiving station.
Figure 17:
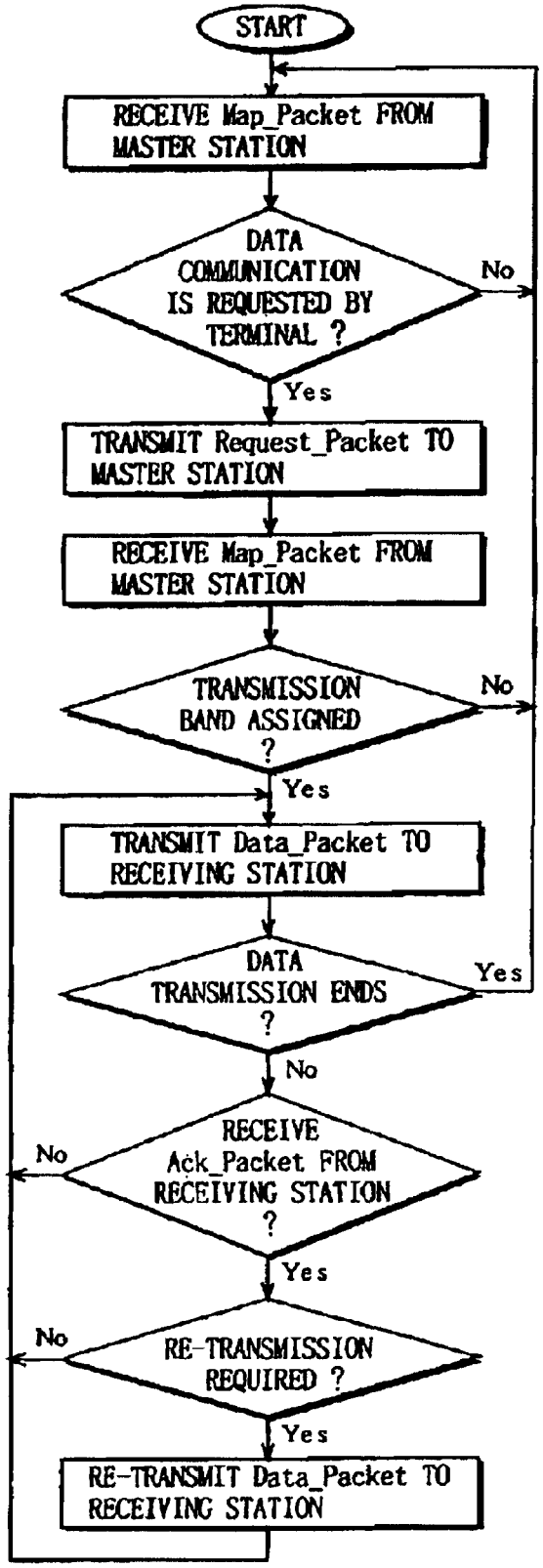
FIG. 17 is a flow chart showing a process that is carried out by the slave station 20 as the transmitting station.
Figure 18:
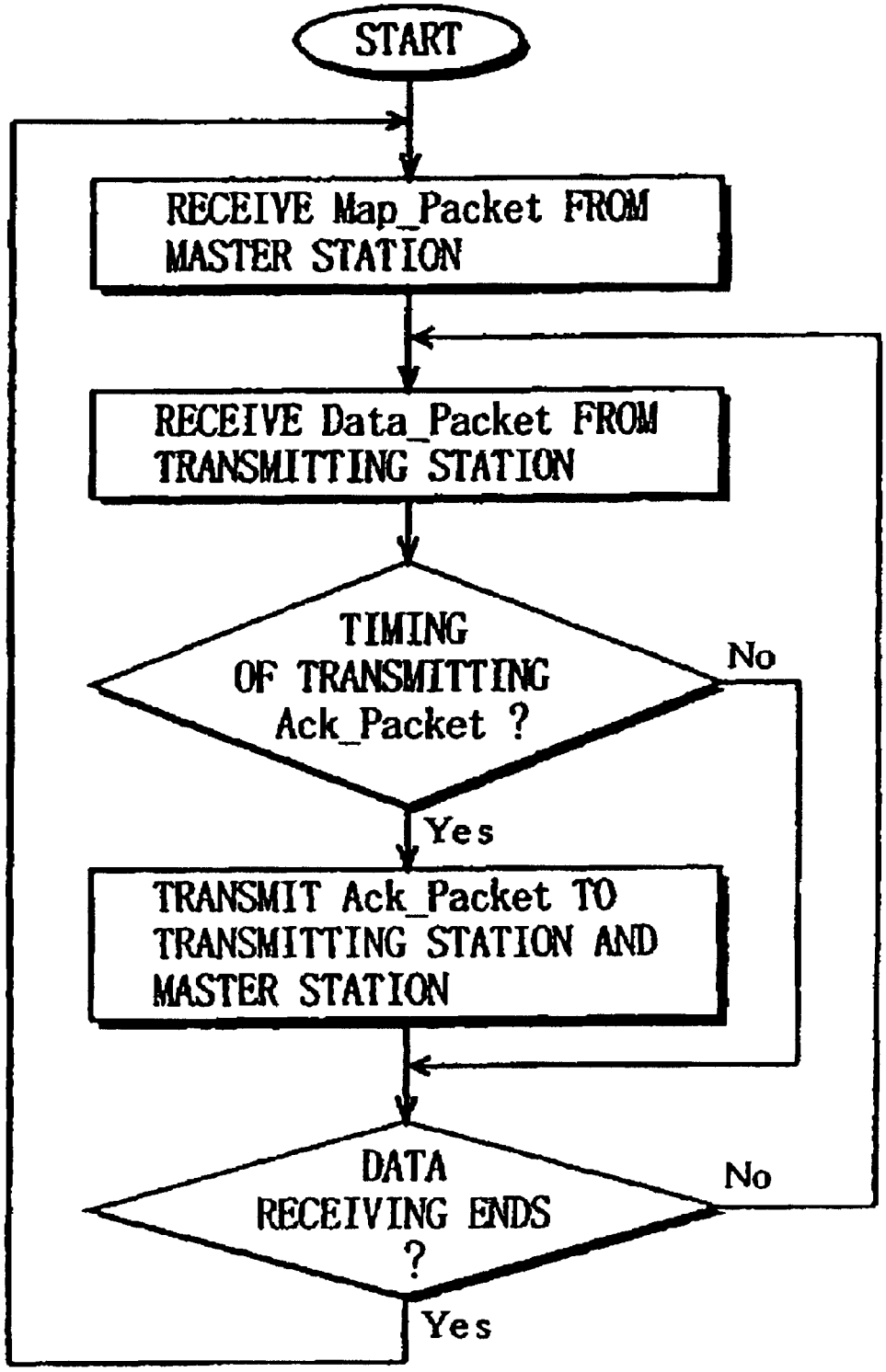
FIG. 18 is a flow chart showing a process that is carried out by the slave station 20 as the receiving station.

The operations which are carried out by the master station 10 and the slave station 20 are shown in FIGS. 15 to 18 when each becomes the transmitting station and the receiving station. FIG. 15 is a flow chart showing the operation by the master station 10 as the transmitting station. FIG. 16 is a flow chart showing the operation by the master station 10 as the receiving station. FIG. 17 is a flow chart showing the operation by the slave station 20 as the transmitting station. FIG. 18 is a flow chart showing the operation by the slave station 20 as the receiving station.

(Specific Examples of Data Communications)

Next, the operation of the wireless communications system according to the above-described embodiment of the present invention is specifically described exemplarily using a specific structure and data.

Figure 19:
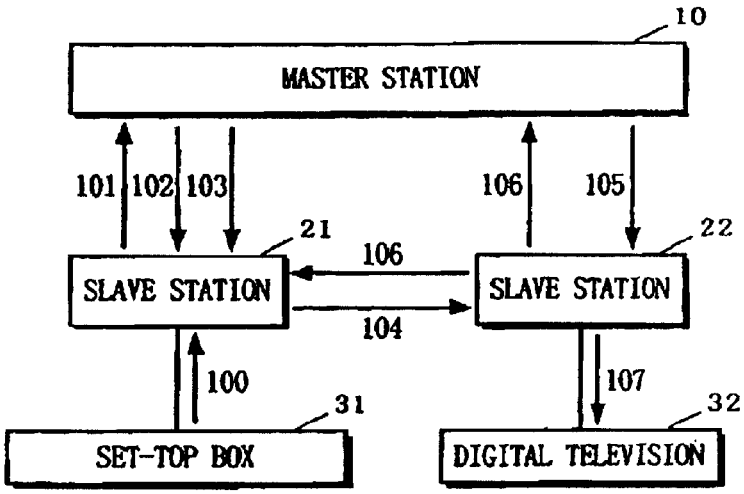
FIGS. 19 and 20 are block diagrams each showing one example of the structure of the wireless communications system according to one embodiment to the present invention.

In a first example, as shown in FIG. 19, the master station 10, a slave station 21 to which a Set-Top Box (STB) 31 is connected, and a slave station 22 to which a digital television 32 is connected form the system, wherein image data is transmitted from the STB 31 to the digital television 32. Assume that the interface of the slave station 21 is an IEEE 1394 interface, and that the slave station 21 is a cycle master having a timing control function of the IEEE 1394. Also assume that the slave station 21 generates timing at IEEE 1394 side based on a time counter of its own for transmitting a cycle start packet (transmitted in a cycle of 125 μs).

When the slave station 21 is provided with data 100 by the STB 31, the controller of the slave station 21 determines whether a new communication link is required. If a new communication link is required, the slave station 21 calculates communication parameters which are required for the communication link. The communication parameters are determined by inquiring of the STB 31 and a resource manager (not shown) whether the data 100 is isochronous data or asynchronous data.

For example, if the data 100 is asynchronous control data, its transmission speed and data period are both variable.

Therefore, the data type of the data is determined to be UBR. If the data 100 is isochronous video data, the transmission speed and data period are calculated by accessing the resource manager of the IEEE 1394 network and the STB 31 for determining all of the communication parameters. If the transmission speed and data period are both constant, for example, 6 Mbps and 33 ms, respectively, the communication type of the data is determined to be CBR. Similarly, if the transmission speed is variable but the data period is constant, 50 ms, for example, the communication type of the data is determined to be VBR. Also, if the average transmission speed is 2 Mps but the data period is variable, the communication type of the data is determined to be ABR.

In this example, image data is sent from the STB 31 to the digital television 32. Therefore, communication is made from the slave station 21 to the slave station 22. Thus, the slave station 21 generates Request_Packet 101 in which the address of the slave station 21 is stored as the sender address, the address of the slave station 22 is stored as the destination address, and the parameters which are determined in the above-described manner are stored in the communication parameter. The slave station 21 then transmits the generated Request_Packet 101 to the master station 10 in the transmission timing of one unused transmission band based on Map_Packet 102 which is provided by the master station 10. Upon receiving Request_Packet 101, the master station 10 carries out scheduling for setting a new communication link, and then transmits Map_Packet 103 so as to give information about assigned transmission bands to the slave station 21. The slave station 21 receives Map_Packet 103 from the master station 10, generates Data_Packet 104 based on the specified transmission timing and transmission amount, and then transmits the generated Data_Packet 104 to the slave station 22.

Upon receiving Data_Packet 104 from the slave station 21, the slave station 22 carries out an error check of Data_Packet 104 and also manages the transmission sequence number and packet division information. Here, if the image data is divided into a plurality of Data_Packet, the slave station 22 buffers them so as to reconstruct the image data based on the packet division information. This reconstruction is performed as follows. First, data of the same packet number is collected so as to construct the original data based on the division number and data length. Then, if the number of segment packets becomes equal to the number of divisions, data reconstruction is completed. The slave station 22 then outputs image data 107 which is reconstructed in the above-described manner to the digital television 32.

On the other hand, when receiving Map_Packet 105 from the master station 10 and detecting that one transmission band has been assigned for Ack_Packet transmission, the slave station 22 transmits Ack_Packet 106 to the slave station 21 and the master station 10.

Next, when receiving Ack_Packet 106 from the slave station 22, the slave station 21 checks the receive sequence number and receive history included in Ack_Packet 106 and, if required, re-transmits the relevant Data_Packet. Also, when receiving Ack_Packet 106 from the slave station 22, the master station 10 checks the receive sequence number and receive history included in Ack_Packet 106, and reflects the check results on the next scheduling.

By repeatedly carrying out the above-described process, image data can be transmitted between the slave stations 21 and 22.

Figure 20:
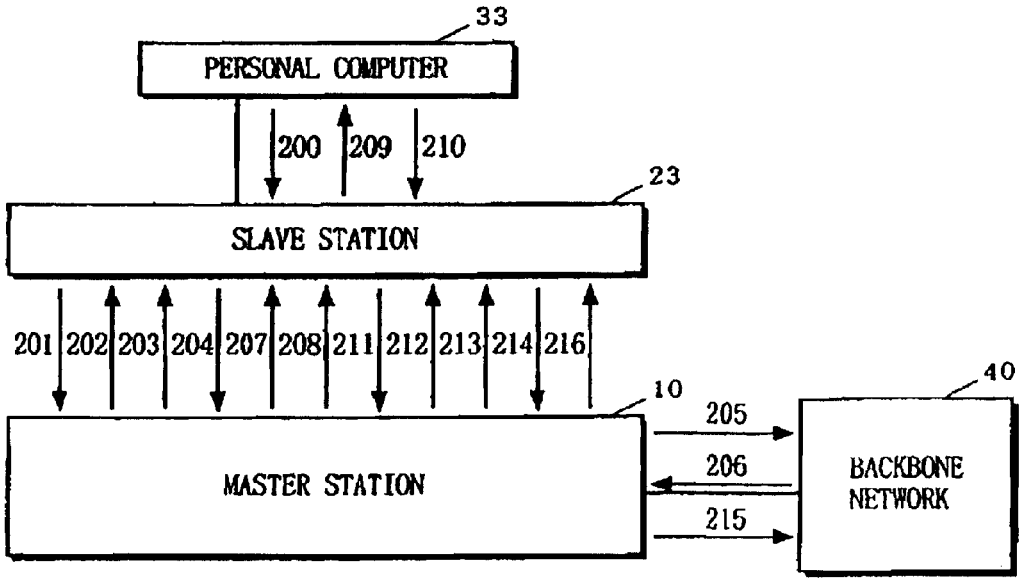
Figure 21:
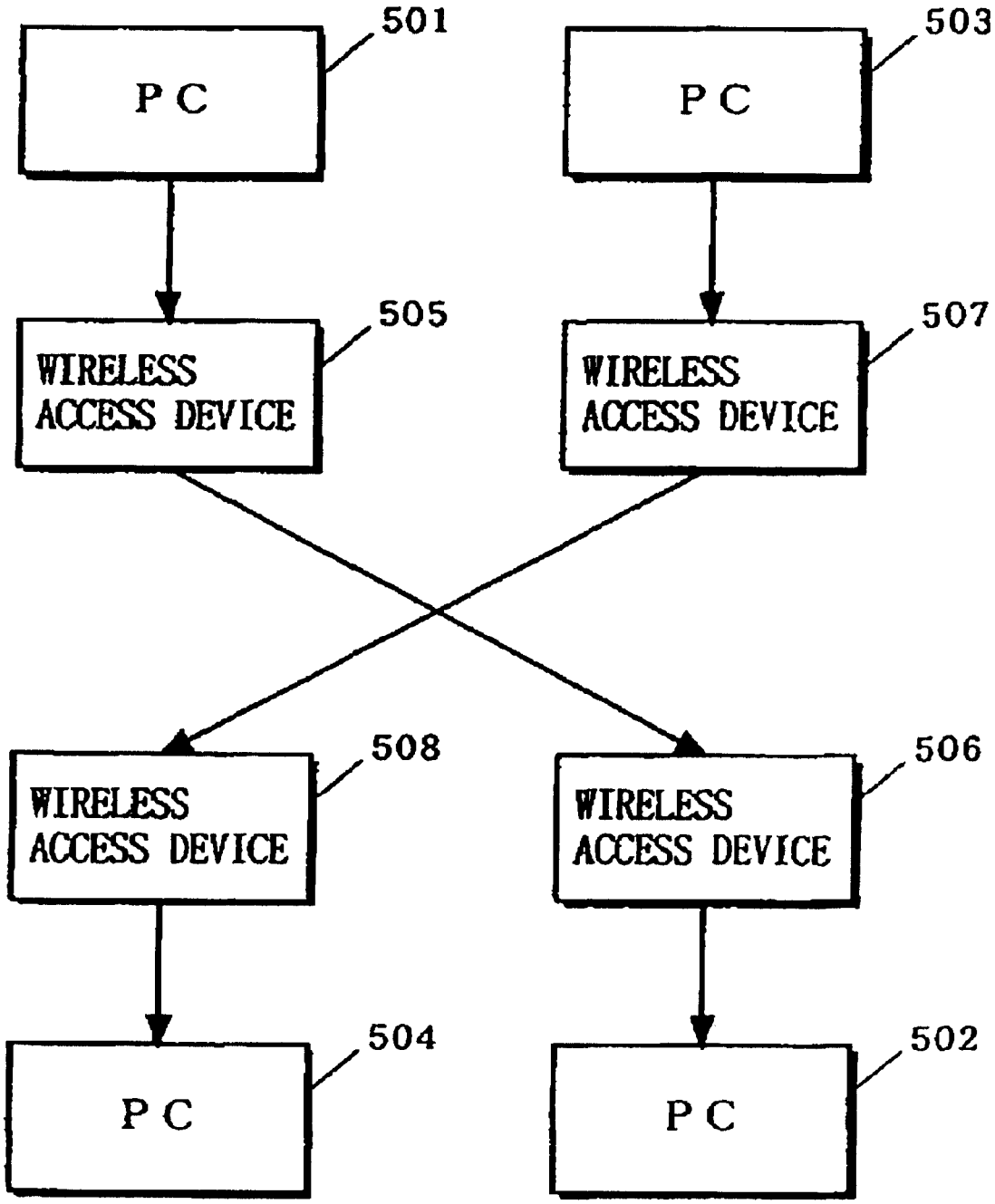
FIG. 21 PRIOR ART
FIG. 21 is a block diagram showing one example of the structure of the conventional wireless communications system.

In a second example, as shown in FIG. 20, a master station 10 is connected to a backbone network 40 in a household, and a slave station 23 to which a personal computer (PC) 33 is connected form a system, wherein an Internet protocol (IP) data is transmitted from the PC 33 to the backbone network 40.

First, a flow of IP data will be described. If the MAC address (the address of an Ethernet interface) of a receiving device is not known, a transmitting device has to obtain the MAC address by using an address request protocol (ARP). A request packet for ARP (hereinafter, ARP request packet) includes the IP address and MAC address of the transmitting device and the IP address of the receiving device. The transmitting device transmits the ARP request packet to a broadcast address indicating the addresses of all of the devices. Upon receiving the ARP request packet, each receiving device gives its own MAC address to the transmitting device by using an ARP reply packet. Thereafter, the transmitting device specifies one receiving device by using a set of the obtained MAC address and the IP address, and transmits an IP data packet to the receiving device.

To send the IP data to the receiving device over the backbone network 40, the PC 33 first outputs an ARP request packet 200 to the slave station 23. Upon receiving the ARP request packet 200 from the PC 33, the slave station 23 determines whether a new communication link is required. If a new communication link is required, the slave station 23 calculates communication parameters which are required for the new communication link for generating Request_Packet 201 in which UBR is set as the communication type because the ARP is used, the slave station 23 is set as the sender address, and the broadcast address is set as the destination address. If the ARP is not used and the IP data is of IP version 4 (IPv4), the communication type is set as UBR. If the IP data is of IP version 6 (IPv6), the communication type, the transmission speed, and the data period are set according to the analysis results of the IP header and a real time protocol (RTP). Alternatively, the slave station 23 inquires of an application of the PC 33, and therefore, the communication parameter is determined.

The slave station 23 then transmits the generated Request_Packet 201 to the master station 10 in the transmission timing of one unused transmission band based on Map_Packet 202 which is provided by the master station 10. Upon receiving Request_Packet 201, the master station 10 carries out scheduling so as to set the requested communication link, and transmits Map_Packet 203 so as to give information about assigned transmission bands to the slave station 23. Upon receiving Map_Packet 203 from the master station 10, the slave station 23 generates Data_Packet 204 including an ARP request packet 205 in accordance with the specified transmission timing and transmission amount, and transmits the generated Data_Packet 204 having a broadcast address to the master station 10.

Upon receiving Data_Packet 204 from the slave station 23, the master station 10 carries out an error check on Data_Packet 204, and also takes out the ARP request packet 205 for output to the backbone network 40. The master station 10 also passes the data to an upper-layer protocol. In the upper-layer protocol, a relation table is made so as to relate the sender address and IP address together.

When the receiving device over the backbone network 40 returns an ARP reply packet 206, the master station 10 passes the data to the upper-layer protocol. If, in the upper-layer protocol, the destination address (in this case, the slave station 23) is found by searching the relation table in the upper-layer protocol with the IP address as an argument, the master station 10 carries out scheduling so as to set a new communication link with the master station 10 as the sender address, the slave station 23 as the destination address, and UBR as the communication type. The master station 10 then transmits Map_Packet 207 to give information about assigned transmission bands to the slave station 23, and also transmits Data_Packet 208 including an ARP reply packet 209 to the slave station 23.

Upon receiving Data_Packet 208 from the master station 10, the slave station 23 takes out an ARP reply packet 209 for output to the PC 33. The slave station 23 also passes the data to the upper-layer protocol, wherein a relation table is made to relate the sender address and IP address together.

The PC 33 obtains the MAC address by receiving the ARP replay packet 209, and generates an IP data packet 210 for output to the slave station 23.

Upon On receiving the IP data packet 210 from the PC 33, the slave station 23 passes the data to the upper-layer protocol. If, in the upper-layer protocol, the destination address (in this case, the master station 10) is found by searching the relation table with the IP address as an argument, the slave station 23 then determines whether a new communication link is required. In this case, it is determined that a new communication link is required. Therefore, the slave station 23 calculates communication parameters which are required for the new communication link, and generates Request_Packet 211 wherein UBR is set as the communication type because the IP data is of IPv4, the slave station 23 is set as the sender address, and the master station 10 is set as the destination address. The slave station 23 then transmits the generated Request_Packet 211 in the transmission timing of one unused transmission band based on Map_Packet 212 which is provided by the master station 10. At this time, if the transmission band has been already assigned for the communication link by Request_Packet 201, the slave station 23 may transmit Request_Packet 211 by using this assigned transmission band.

Upon receiving Request_Packet 211, the master station 10 carries out scheduling so as to set the requested new communication link, and transmits Map_Packet 213 so as to give information about assigned transmission bands to the slave station 23. Upon receiving Map_Packet 213 from the master station 10, the slave station 23 generates Data_Packet 214 including an IP data packet 215 in accordance with the specified transmission timing and transmission amount for output to the master station 10. At this time, if Map_Packet 213 includes an assigned transmission band for any other communication link of the slave station 23 without transmission data, the slave station 23 may transmit Data Packet 214 by using this transmission band.

Upon receiving Data_Packet 214 from the slave station 23, the master station 10 takes out an IP data packet 215 for output to the backbone network 40. At the same time, the master station 10 calculates the amount of data which is correctly received in consideration of variations in amount of data due to re-transmission, and carries out scheduling by taking the calculated data amount as the received data amount Vdr (updating of scheduling). Thus, the state of data receiving is reflected on the next scheduling. Also, when detecting that one transmission band is assigned for Ack_Packet transmission as a result of scheduling, the master station 10 transmits Ack_Packet 216 to the slave station 23.

Upon receiving Ack_Packet 216 from the master station 10, the slave station 23 then checks the receive sequence number and receive history included in Ack_Packet 216 so as to determine whether Data_Packet has to be re-transmitted.

By repeatedly carrying out the above-described process, IP data can be transmitted between the slave station 23 and the master station 10.

While the present invention has been described in detail, the foregoing description is in all aspects illustrative and not restrictive. It is to be understood that numerous other modifications and variations can be devised without departing from the scope of the present invention.

What is claimed is:

[1. A wireless communication system comprising:

a master station, which is a wireless access unit for managing access to a wireless network; and at least one slave station, which is one or more other wireless access units;

wherein said master station and said at least one slave station are on the wireless network in which data is at least one of transmitted between said master station and said at least one slave station, and transmitted between said at least one slave station and another slave station by using at least one of:

a constant bit rate communication type which is constant in transmission speed and data period;

a variable bit rate communication type which is variable in transmission speed and constant in data period;

an available bit rate communication type which is constant in transmission speed and variable in data period; and an unspecified bit rate communication type which is variable in transmission speed and data period;

wherein said master station comprises:

a scheduler for performing scheduling by regularly determining a transmission band assignment including information regarding a transmission timing of the data, a transmission amount, and whether said master station or any one of said at least one slave station is allowed to access said wireless access system; and means for providing said scheduler with communication parameters for the data transmission which are needed by each of the communication types in order to make a request for setting a communication link for data transmission, the communication parameters including at least one of a part and an entire transmission amount, transmission speed, data period and priority;

wherein said at least one slave station comprises means for providing said scheduler with a communication parameter for the data transmission which are needed by each of the communication types by transmitting communication parameters for the data transmission to said master station by using a request packet in order to make the request for setting the communication link for data transmission, the communication parameters including at least one of a part and an entire transmission amount, transmission speed, data period and priority;

wherein said master station comprises means for giving the transmission band assignment packet scheduled by said scheduler to said at least one slave station by using a band assignment packet and recognizing the transmission band assignment;

wherein said master station comprises means for transmitting, to said at least one slave station, the band assignment packet with a transmission time stamp value indicating a transmission time added thereto;

wherein said at least one slave station comprises means for synchronizing a time counter of said at least one slave station with a time counter of said master station by using the transmission time stamp value transmitted from said master station;

wherein a transmitting station and a receiving station between which the communication link is set by the transmission band assignment carry out bi-directional data transmission according to the transmission band assignment; and wherein said transmitting station is at least one of said master station and said at least one slave station which sends the data, and said receiving station is at least one of said master station and said at least one slave station which receives the data.]

[2. The wireless communication system according to claim 1, wherein the communication type indicated by the communication parameter is the unspecified bit rate communication type, and said scheduler comprises means for carrying out the transmission band assignment according to at least one of an order in which the communication link has been set and a priority order of the priority parameter included in the communication parameter.]

[3. The wireless communication system according to claim 1, wherein said scheduler comprises means for deleting the setting of the communication link when said scheduler detects that the transmission band of the set communication link is not used.]

[4. The wireless communication system according to claim 1, wherein said master station comprises means for giving, to said at least one slave station, the band assignment packet with a probability parameter for access control of the request packet added thereto, and said at least one slave station comprises means for transmitting the request packet only when the given probability parameter exceeds a random number generated within a range of values which the probability parameter can take.]

[5. The wireless communication system according to claim 1, wherein said transmitting station comprises means for dividing the data into a specified length for generating data packets for transmission when said scheduler schedules the transmission band assignment for data transmission.]

6. [The wireless communication system according to claim 1,] *A wireless communication system comprising:*

*a master station, which is a wireless access unit for managing access to a wireless network; and*

*at least one slave station, which is one or more other wireless access units;*

*wherein said master station and said at least one slave station are on the wireless network in which data is at least one of transmitted between said master station and said at least one slave station, and transmitted between said at least one slave station and another slave station by using at least one of:*

*a constant bit rate communication type which is constant in transmission speed and data period;*

*a variable bit rate communication type which is variable in transmission speed and constant in data period;*

*an available bit rate communication type which is constant in transmission speed and variable in data period; and*

*an unspecified bit rate communication type which is variable in transmission speed and data period;*

*wherein said master station comprises:*

*a scheduler for performing scheduling by regularly determining a transmission band assignment including information regarding a transmission timing of the data, a transmission amount, and whether said master station or any one of said at least one slave station is allowed to access said wireless access system; and*

*means for providing said scheduler with communication parameters for the data transmission which are needed by each of the communication types in order to make a request for setting a communication link for data transmission, the communication parameters including at least one of a part and an entire transmission amount, transmission speed, data period and priority;*

*wherein said at least one slave station comprises means for providing said scheduler with a communication parameter for the data transmission which are needed by each of the communication types by transmitting communication parameters for the data transmission to said master station by using a request packet in order to make the request for setting the communication link for data transmission, the communication parameters including at least one of a part and an entire transmission amount, transmission speed, data period and priority;*

*wherein said master station comprises means for giving the transmission band assignment scheduled by said scheduler to said at least one slave station by using a band assignment packet and recognizing the transmission band assignment;*

*wherein said master station comprises means for transmitting, to said at least one slave station, the band assignment packet with a transmission time stamp value indicating a transmission time added thereto;*

*wherein said at least one slave station comprises means for synchronizing a time counter of said at least one slave station with a time counter of said master station by using the transmission time stamp value transmitted from said master station;*

*wherein a transmitting station and a receiving station between which the communication link is set by the transmission band assignment carry out bi-directional data transmission according to the transmission band assignment;*

*wherein said transmitting station is at least one of said master station and said at least one slave station which sends the data, and said receiving station is at least one of said master station and said at least one slave station which receives the data; and* wherein when a plurality of communication links are set to said transmitting station and there is no data packet to be transmitted to a specific communication link, said transmitting station comprises means for transmitting a data packet to be transmitted to another communication link by using a transmission band assigned to the specific communication link.

[7. The wireless communication system according to claim 1, wherein said at least one slave station comprises means for transmitting, to said master station, the request packet with a transmission stamp value indicating a transmission time added thereto, said master station comprises means for calculating a space propagation delay time from a difference between a receive time and the transmission time stamp value when receiving the request packet with the transmission time stamp value added thereto, and for giving, to said at least one slave station, the band assignment packet indicating an adjusted value according to the space propagation delay time, and said at least one slave station comprises means for correcting transmission timings of the request packet and the data packet according to the given adjusted value.]

[8. The wireless communication system according to claim 1, wherein said receiving station which is indicated by a destination of the band assignment packet comprises means for, when receiving the band assignment correctly, carrying out intermittent receiving in timing when the data packet transmitted from said transmitting station and the band assignment packet which is transmitted next from said master station are received, and means for, when not receiving the band assignment correctly, carrying out intermittent receiving only after receiving the band assignment which is transmitted next correctly.]

[9. A wireless communication system comprising:

a master station, which is a wireless access unit for managing access to a wireless network; and at least one slave station, which is one or more other wireless access units;

wherein said master station and said at least one slave station are on the wireless network in which data is at least one of transmitted between said master station and said at least one slave station, and transmitted between said at least one slave station and another slave station by using at least one of:

a constant bit rate communication type which is constant in transmission speed and data period;

a variable bit rate communication type which is variable in transmission speed and constant in data period;

an available bit rate communication type which is constant in transmission speed and variable in data period; and an unspecified bit rate communication type which is variable in transmission speed and data period;

wherein said master station comprises a scheduler operable to perform scheduling by regularly determining a transmission band assignment including information regarding a transmission timing of the data, a transmission amount, and whether said master station or any one of said at least one slave station is allowed to access said wireless access system, said scheduler being provided with communication parameters for the data transmission which are needed by each of the communication types in order to make a request for setting a communication link for data transmission, the communication parameters including at least one of a part and an entire transmission amount, transmission speed, data period and priority;

wherein said at least one slave station is operable to provide said scheduler with a communication parameter for the data transmission which are needed by each of the communication types by transmitting communication parameters for the data transmission to said master station by using a request packet in order to make the request for setting the communication link for data transmission, the communication parameters including at least one of a part and an entire transmission amount, transmission speed, data period and priority;

wherein said master station is operable to give the transmission band assignment scheduled by said scheduler to said at least one slave station by using a band assignment packet and recognizing the transmission band assignment packet;

wherein said master station is operable to transmit, to said at least one slave station, the band assignment packet with a transmission time stamp value indicating a transmission time added thereto;

wherein said at least one slave station is operable to synchronize a time counter of said at least one slave station with a time counter of said master station by using the transmission time stamp value transmitted from said master station;

wherein a transmitting station and a receiving station between which the communication link is set by the transmission band assignment are operable to carry out bi-directional data transmission according to the transmission band assignment;

wherein said transmitting station is at least one of said master station and said at least one slave station which sends the data, and said receiving station is at least one of said master station and said at least one slave station which receives the data.]

[10. The wireless communication system according to claim 9, wherein the communication type indicated by the communication parameter is the unspecified bit rate communication type, and said scheduler is operable to schedule the transmission band assignment according to at least one of an order in which the communication link has been set and a priority order of the priority parameter included in the communication parameter.]

[11. The wireless communication system according to claim 9, wherein said scheduler is operable to delete the setting of the communication link when said scheduler detects that the transmission band of the set communication link is not used.]

[12. The wireless communication system according to claim 9, wherein said master station is operable to give, to said at least one slave station, the band assignment packet with a probability parameter for access control of the request packet added thereto, and said at least one slave station is operable to transmit the request packet only when the given probability parameter exceeds a random number generated within a range of values which the probability parameter can take.]

[13. The wireless communication system according to claim 9, wherein said transmitting station is operable to divide the data into a specified length for generating data packets for transmission when said scheduler schedules the transmission band assignment for data transmission.]

14. [The wireless communication system according to claim 9.] *A wireless communication system comprising:*

*a master station, which is a wireless access unit for managing access to a wireless network; and*

*at least one slave station, which is one or more other wireless access units;*

*wherein said master station and said at least one slave station are on the wireless network in which data is at least one of transmitted between said master station and said at least one slave station, and transmitted between said at least one slave station and another slave station by using at least one of:*

*a constant bit rate communication type which is constant in transmission speed and data period;*

*a variable bit rate communication type which is variable in transmission speed and constant in data period;*

*an available bit rate communication type which is constant in transmission speed and variable in data period; and*

*an unspecified bit rate communication type which is variable in transmission speed and data period;*

*wherein said master station comprises a scheduler operable to perform scheduling by regularly determining a transmission band assignment including information regarding a transmission timing of the data, a transmission amount, and whether said master station or any one of said at least one slave station is allowed to access said wireless access system, said scheduler being provided with communication parameters for the data transmission which are needed by each of the communication types in order to make a request for setting a communication link for data transmission, the communication parameters including at least one of a part and an entire transmission amount, transmission speed, data period and priority;*

*wherein said at least one slave station is operable to provide said scheduler with a communication parameter for the data transmission which are needed by each of the communication types by transmitting communication parameters for the data transmission to said master station by using a request packet in order to make the request for setting the communication link for data transmission, the communication parameters including at least one of a part and an entire transmission amount, transmission speed, data period and priority;*

*wherein said master station is operable to give the transmission band assignment scheduled by said scheduler to said at least one slave station by using a band assignment packet and recognizing the transmission band assignment;*

*wherein said master station is operable to transmit, to said at least one slave station, the band assignment packet with a transmission time stamp value indicating a transmission time added thereto;*

*wherein said at least one slave station is operable to synchronize a time counter of said at least one slave station with a time counter of said master station by using the transmission time stamp value transmitted from said master station;*

*wherein a transmitting station and a receiving station between which the communication link is set by the transmission band assignment are operable to carry out bi-directional data transmission according to the transmission band assignment;*

*wherein said transmitting station is at least one of said master station and said at least one slave station which sends the data, and said receiving station is at least one of said master station and said at least one slave station which receives the data; and* wherein when a plurality of communication links are set to said transmitting station and there is no data packet to be transmitted to a specific communication link, said transmitting station is operable to transmit a data packet to be transmitted to another communication link by using a transmission band assigned to the specific communication link.

[15. The wireless communication system according to claim 9, wherein said at least one slave station is operable to transmit, to said master station, the request packet with a transmission stamp value indicating a transmission time added thereto, said master station is operable to calculate a space propagation delay time from a difference between a receive time and the transmission time stamp value when receiving the request packet with the transmission time stamp value added thereto, and to give, to said at least one slave station, the band assignment packet indicating an adjusted value according to the space propagation delay time, and said at least one slave station is operable to correct transmission timings of the request packet and the data packet according to the given adjusted value.]

[16. The wireless communication system according to claim 9, wherein said receiving station which is indicated by a destination of the band assignment packet is operable to when receiving the band assignment correctly, carry out intermittent receiving in timing when the data packet transmitted from said transmitting station and the band assignment packet which is transmitted next from said master station are received, and when not receiving the band assignment correctly, carry out intermittent receiving only after receiving the band assignment which is transmitted next correctly.]

* * * * *